United States Patent
Sanji et al.

(10) Patent No.: US 12,530,935 B2
(45) Date of Patent: Jan. 20, 2026

(54) POSITION ESTIMATION SYSTEM, POSITION ESTIMATION METHOD, AND VEHICLE COMMUNICATION DEVICE

(71) Applicant: DENSO CORPORATION, Kariya (JP)

(72) Inventors: Kenichirou Sanji, Kariya (JP); Takashi Saiki, Kariya (JP)

(73) Assignee: DENSO CORPORATION, Kariya (JP)

( * ) Notice: Subject to any disclaimer, the term of this patent is extended or adjusted under 35 U.S.C. 154(b) by 483 days.

(21) Appl. No.: 17/985,255

(22) Filed: Nov. 11, 2022

(65) Prior Publication Data

US 2023/0066445 A1    Mar. 2, 2023

Related U.S. Application Data

(63) Continuation of application No. PCT/JP2021/011732, filed on Mar. 22, 2021.

(30) Foreign Application Priority Data

May 14, 2020  (JP) .................................. 2020-085400

(51) Int. Cl.
*H04W 4/02* (2018.01)
*B60W 50/04* (2006.01)
(Continued)

(52) U.S. Cl.
CPC ....... *G07C 9/00309* (2013.01); *B60W 50/045* (2013.01); *H04W 64/003* (2013.01);
(Continued)

(58) Field of Classification Search
CPC .......... G01S 7/023; G01S 13/87; G01S 13/04; G01S 13/88; G01S 7/0232; G01S 7/0235;
(Continued)

(56) References Cited

U.S. PATENT DOCUMENTS

2004/0095269 A1* 5/2004 Uehara .................... G01S 7/023
    342/159
2009/0085791 A1* 4/2009 Ruby ...................... G01S 7/023
    342/70

(Continued)

FOREIGN PATENT DOCUMENTS

JP    2000342309 A    12/2000
JP    2003093368 A    4/2003
(Continued)

*Primary Examiner* — Quan M Hua
(74) *Attorney, Agent, or Firm* — Harness, Dickey & Pierce, P.L.C.

(57) ABSTRACT

A position estimation system includes: a position estimation unit configured to estimate a position of a mobile terminal based on a reception status of signals that are transmitted from the mobile terminal and received by a plurality of communication devices; a scene determination unit configured to determine, based on information from a sensor mounted in a vehicle, whether a current status is a simultaneous operation scene in which both a millimeter wave radar and a radar vicinity device are operable simultaneously; and an operating mode changing unit configured to change an operating mode of at least one of the millimeter wave radar, the communication device, or the position estimation unit in response to the scene determination unit determining that the current status is the simultaneous operation scene.

8 Claims, 14 Drawing Sheets

(51) Int. Cl.
*G07C 9/00* (2020.01)
*H04W 64/00* (2009.01)

(52) U.S. Cl.
CPC . *B60W 2050/046* (2013.01); *B60W 2420/408* (2024.01); *G07C 2009/00373* (2013.01)

(58) Field of Classification Search
CPC ........ G01S 13/878; G01S 13/42; G01S 7/415; G01S 7/40; G01S 7/285; G01S 2013/9316; G01S 13/56; G01S 17/86; G01S 13/343; G08G 1/161; H04L 27/12; H04W 4/46; H04W 56/001; H04W 56/0015
See application file for complete search history.

(56) References Cited

U.S. PATENT DOCUMENTS

| | | | |
|---|---|---|---|
| 2019/0056476 A1* | 2/2019 | Lin | G01S 7/021 |
| 2019/0195985 A1* | 6/2019 | Lin | G01S 7/0233 |
| 2019/0375372 A1 | 12/2019 | Sanji et al. | |
| 2020/0233072 A1 | 7/2020 | Osai et al. | |
| 2021/0168563 A1 | 6/2021 | Sanji et al. | |
| 2021/0181294 A1 | 6/2021 | Kusumoto et al. | |
| 2021/0368472 A1* | 11/2021 | Ohashi | G01S 13/765 |

FOREIGN PATENT DOCUMENTS

| | | | |
|---|---|---|---|
| JP | 4007498 B2 | 11/2007 | |
| JP | 2013076568 A | 4/2013 | |
| JP | 2015214316 A | 12/2015 | |
| JP | 2017208580 A | 11/2017 | |
| JP | 2018141771 A | 9/2018 | |
| JP | 2019073960 A | 5/2019 | |
| JP | 2019158765 A | 9/2019 | |
| JP | 2020026996 A | 2/2020 | |
| JP | 2020026998 A | 2/2020 | |

* cited by examiner

POSITION ESTIMATION SYSTEM, POSITION ESTIMATION METHOD, AND VEHICLE COMMUNICATION DEVICE

CROSS REFERENCE TO RELATED APPLICATION

This application is a continuation application of International Patent Application No. PCT/JP2021/011732 filed on Mar. 22, 2021, which designated the U.S. and claims the benefit of priority from Japanese Patent Application No. 2020-085400 filed on May 14, 2020. The entire disclosure of all of the above application is incorporated herein by reference.

TECHNICAL FIELD

The present disclosure relates to a position estimation system, a position estimation method, and a vehicle communication device in which a position of a mobile terminal with respect to a vehicle is estimated by wirelessly communicating with the mobile terminal carried by a user of the vehicle.

BACKGROUND

There has been known a system (hereinafter, referred to as a position estimation system) for estimating the position of the mobile terminal with respect to a vehicle by performing a wireless communication between an in-vehicle device mounted on the vehicle and the mobile terminal carried by a user of the vehicle. More specifically, the in-vehicle device sequentially transmits the request signal from one communication device provided in the vicinity of a driver's seat inside the vehicle cabin, and when the mobile terminal receives a request signal requesting the return of the response signal from the in-vehicle device, the mobile terminal returns the response signal including the Received Signal Intensity Indication (RSSI) of the request signal. When receiving the response signal returned from the mobile terminal, the in-vehicle device determines whether the mobile terminal is present in a vehicle cabin based on the RSSI included in the response signal.

The above-described mobile terminal is a communication terminal having a communication function by Bluetooth (registered trademark), and a smartphone, a cellular phone, or the like is assumed as the mobile terminal. Along with this, the in-vehicle device performs wireless communication compliant with Bluetooth (registered trademark). For convenience, hereafter, communication compliant with a predetermined wireless communication standard such as Bluetooth, in which a communication area is, for example, about several tens of meters at the maximum, is referred to as short-range communication.

In order to estimate the position of the mobile terminal with high accuracy, a position estimation system has also been studied in which communication devices are installed at multiple locations in the vehicle, and detects the position of the vehicle with respect to the mobile terminal from a communication status (reception strength and signal flight time) with the mobile terminal at each communication device.

SUMMARY

According to one aspect of the present disclosure, a position estimation system estimates a relative position of a mobile terminal with respect to a vehicle by wirelessly communicating, via a plurality of communication devices mounted in the vehicle, with the mobile terminal carried by a user. The plurality of communication devices include at least one radar vicinity device that is a communication device disposed near a millimeter wave radar. The position estimation system includes: a position estimation unit that is configured to estimate a position of the mobile terminal based on a reception status of signals that are transmitted from the mobile terminal and received by the plurality of communication devices; a scene determination unit that is configured to determine, based on information from a sensor mounted in the vehicle, whether a current status is a simultaneous operation scene in which both the millimeter wave radar and the radar vicinity device are operable simultaneously; and an operating mode changing unit that is configured to change an operating mode of at least one of the millimeter wave radar, the communication device, or the position estimation unit in response to the scene determination unit determining that the current status is the simultaneous operation scene.

DESCRIPTION OF EMBODIMENTS

Figure 1:
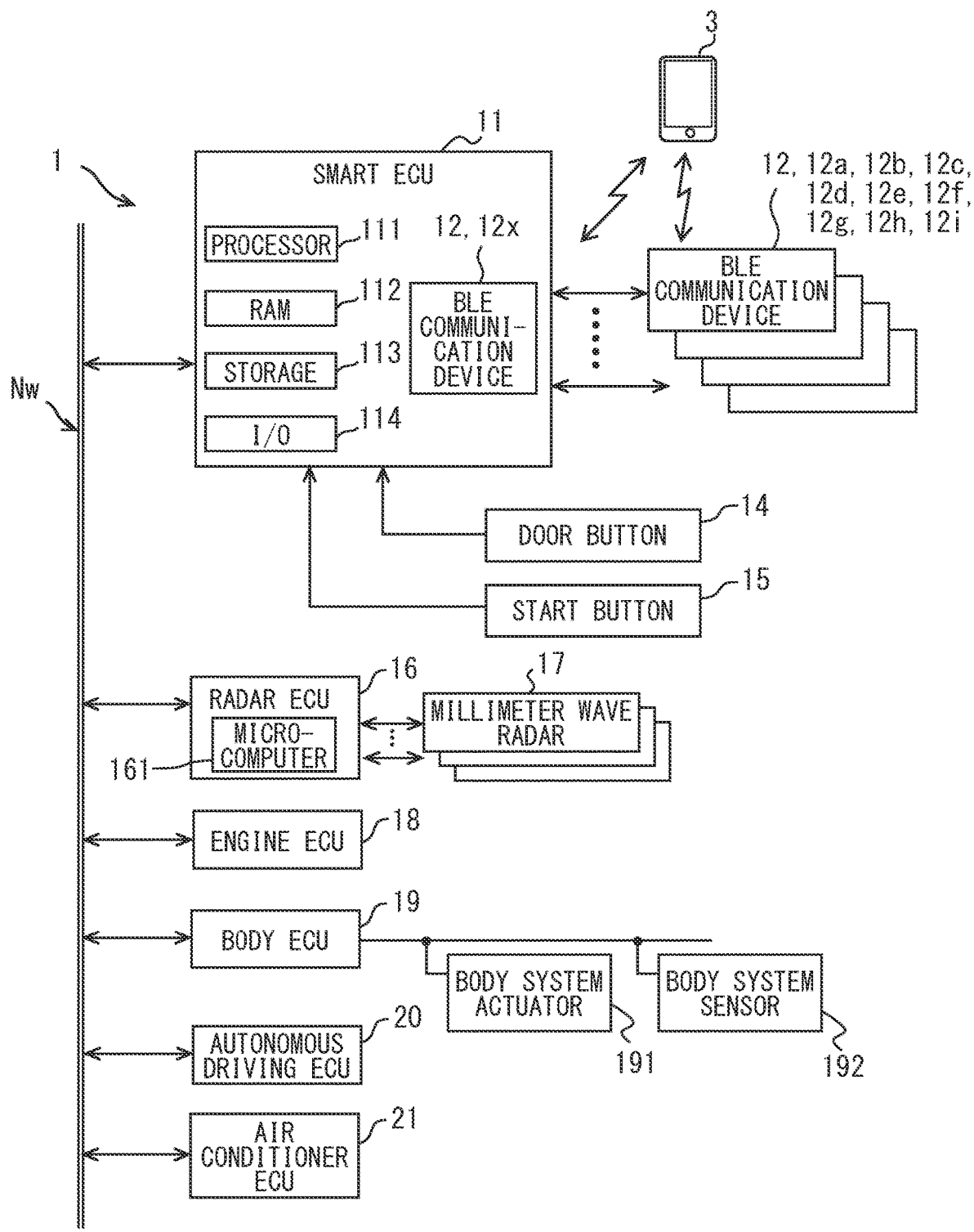
FIG. 1 is a block diagram showing a configuration of an in-vehicle system.

Next, a relevant technology will be described only for understanding the following embodiments. In a position estimation system that estimates a position of a mobile terminal using communication devices installed at multiple locations in a vehicle, for example, there is a demand for installing a communication device at a location where a radio wave from an outside of the vehicle cabin such as a bumper portion can be easily received.

However, a millimeter wave radar may be mounted in a portion such as the bumper where a radio wave environment is good. Considering that a space of the portion where the radio wave environment is good is finite, it is expected a case where the millimeter wave radar and the communication device are disposed close to each other. In particular, since the number of millimeter wave radars and communication devices mounted in the vehicle tends to increase, there is a concern that the number of cases where the millimeter wave radars and the communication devices are disposed close to each other is increased, and a degree of vicinity between the both is increased.

When the communication device is disposed in the vicinity of the millimeter wave radar, for example, the radio wave transmitted by the communication device becomes noise for the millimeter wave radar and may cause a range finder error. The radio waves transmitted by the millimeter wave radar also become noise for the communication device, which may adversely influence a position estimation accuracy of the mobile terminal. The term "vicinity" here refers to a range in which the millimeter wave radar and the BLE communication device can interfere with each other. For example, a range within 10 cm from the millimeter wave radar can be regarded as the vicinity of the millimeter wave radar.

The present disclosure is based on this circumstance, and one of the objectives thereof is to provide a position estimation system, a position estimation method, and a vehicle communication device capable of restricting interference between a millimeter wave radar and a communication device.

According to a first aspect of the present disclosure, a position estimation system estimates a relative position of a mobile terminal with respect to a vehicle by wirelessly communicating, via a plurality of communication devices mounted in the vehicle, with the mobile terminal carried by a user. The plurality of communication devices include at least one radar vicinity device that is a communication device disposed near a millimeter wave radar. The position estimation system includes: a position estimation unit that is configured to estimate a position of the mobile terminal based on a reception status of signals that are transmitted from the mobile terminal and received by the plurality of communication devices; a scene determination unit that is configured to determine, based on information from a sensor mounted in the vehicle, whether a current status is a simultaneous operation scene in which both the millimeter wave radar and the radar vicinity device are operable simultaneously; and an operating mode changing unit that is configured to change an operating mode of at least one of the millimeter wave radar, the communication device, or the position estimation unit in response to the scene determination unit determining that the current status is the simultaneous operation scene.

According to the above configuration, at least one of the millimeter wave radar, the communication device, and the position estimation unit can be operated in different modes in a case where the current status corresponds to the simultaneous operation scene and in a case where the current status does not correspond to the simultaneous operation scene. For example, it is possible to set the operating mode of the communication device in the simultaneous operation scene to a mode different from that in the case where the current status is not the simultaneous operation scene (in other words, the normal time). By making the communication device operate differently from the normal time, it is possible to restrict the interference between the millimeter wave radar and the communication device. The same applies to a configuration in which the operating mode of the millimeter wave radar or the position estimation unit is changed instead of the communication device.

According to a second aspect of the present disclosure, a position estimation method is executed by a processor for estimating a relative position of a mobile terminal with respect to a vehicle by wirelessly communicating, via a plurality of communication devices mounted in the vehicle, with the mobile terminal carried by a user. The plurality of communication devices include at least one radar vicinity device which is a communication device disposed near a millimeter wave radar. The position estimation method includes: estimating a position of the mobile terminal based on a reception status of signals that are transmitted from the mobile terminal and received by the plurality of communication devices; determining, based on information from a sensor mounted in the vehicle, whether a current status is a simultaneous operation scene in which both the millimeter wave radar and the radar vicinity device are operable simultaneously; and changing, in response to determining that the current status is the simultaneous operation scene, at least one of an operating mode of the millimeter wave radar, an operating mode of the communication device, or a content of a process of estimating the position of the mobile terminal.

Accordingly, it is possible to restrict the interference between the millimeter wave radar and the communication device by the same operation as the position estimation system.

Furthermore, according to a third aspect of the present disclosure, a vehicle communication device is disposed near a millimeter wave radar and wirelessly communicates, in compliance with a predetermined short-range wireless communication standard, with a mobile terminal carried by a user. The vehicle communication device includes: an antenna that is configured to receive a signal from the mobile terminal; a circuit board on which an electronic component that is configured to process the signal received by the antenna is mounted; and a housing that houses the antenna and the circuit board. The housing includes a shield portion that blocks a radio wave transmitted from the millimeter wave radar.

According to the above configuration, the shield portion restricts the intensity of the radio wave arriving from the millimeter wave radar, and also restricts the intensity of the radio wave from the antenna included in the vehicle communication device to the millimeter wave radar. That is, it is possible to restrict the interference between the millimeter wave radar and the communication device.

Hereinafter, an example of an embodiment of a position estimation system according to the present disclosure will be described with reference to the drawings. FIG. 1 is a diagram showing an example of a schematic configuration of a vehicle electronic key system to which the position estimation system according to the present disclosure is applied. As shown in FIG. 1, the vehicle electronic key system includes an in-vehicle system 1 mounted on a vehicle Hv and a mobile terminal 3 which is a communication terminal carried by a user of the vehicle Hv.

The vehicle Hv is, for example, a vehicle owned by an individual. However, the vehicle Hv may be a vehicle provided for a rental service (so-called rental car) or a vehicle provided for a car-sharing service (so-called shared car). The vehicle Hv may be a robot taxi. When the vehicle Hv is a vehicle provided for the above services (hereinafter referred to as a service vehicle), a person who has a contract to use these services and who has an authority to temporarily use the vehicle Hv based on using reservation of the services, or the like can be a user.

Each direction of front-rear, left-right, and vertical directions in the following description is defined with reference to the vehicle Hv. The front-rear direction corresponds to a longitudinal direction of the vehicle Hv. The left-right direction corresponds to a width direction of the vehicle Hv. The vertical direction corresponds to a height direction of the vehicle Hv. From another point of view, the vertical direction corresponds to a direction perpendicular to a plane parallel to each of the front-rear direction and the left-right direction.

Overview

Each of the in-vehicle system 1 and the mobile terminal 3 is configured to be capable of performing communication compliant with a predetermined short-range wireless communication standard (hereinafter referred to as short-range communication) having a communicable distance of, for example, about 10 m to 100 m. As the short-range communication standard here, for example, Bluetooth Low Energy (Bluetooth is a registered trademark), Wi-Fi (registered trademark), ZigBee (registered trademark), and the like can be employed. Ultra Wide Band-Impulse Radio (UWB-IR) can also be employed as a short-range communication method. The in-vehicle system 1 and the mobile terminal 3 may be configured to enable short-range communication by, for example, methods of multiple types.

An operation of each portion will be described by taking as an example when the in-vehicle system 1 and the mobile terminal 3 perform wireless communication (hereinafter, BLE communication) compliant with a Bluetooth Low Energy standard. A case where a predetermined communication device (BLE communication device 12x which is described later) mounted on the vehicle Hv is set to act as a master in BLE communication and the mobile terminal 3 as a slave will be described. The slave in BLE communication is a device that intermittently transmits an advertisement signal, and transmits and receives data based on a request from the master. The slave is also referred a peripheral. The master is a device that controls a communication connection state and communication timing with the slave. The master is also known as a central. The mobile terminal 3 may be set to operate as the master, and the communication device mounted on the vehicle Hv may be set to operate as the slave.

<About Mobile Terminal 3>

The mobile terminal 3 is a device that is associated with the in-vehicle system 1 and functions as an electronic key of the vehicle Hv. The mobile terminal 3 may be a user-portable device having the above short-range communication function. For example, a smartphone can be used as the mobile terminal 3. Of course, the mobile terminal 3 may be a tablet terminal, a wearable device, a portable music player, a portable game machine, or the like. The signal transmitted by the mobile terminal 3 as short-range communication includes destination information and transmission source information. The transmission source information is, for example, unique identification information (hereinafter referred to as a terminal ID) assigned to the mobile terminal 3. The terminal ID functions as information for identifying another communication terminal from the mobile terminal 3.

The mobile terminal 3 as the slave wirelessly transmits an advertisement signal at a predetermined transmission interval to notify surrounding communication terminals having the short-range communication function of the presence thereof. The advertisement signal is a predetermined communication packet including transmission source information. The in-vehicle system 1 detects that the mobile terminal 3 is present within a range capable of short-range communication with the in-vehicle system 1 by receiving a signal (for example, the advertisement signal) transmitted from the mobile terminal 3 by the above short-range communication function. The mobile terminal 3 also detects that the in-vehicle system 1 is present within the communication range of the mobile terminal 3 by receiving the advertisement signal transmitted from the in-vehicle system 1. Hereinafter, the range in which the in-vehicle system 1 can perform data communication with the mobile terminal 3 each other by the short-range communication function is also described as a communication area.

<About Configuration of in-Vehicle System 1>

A configuration and an operation of the in-vehicle system 1 will be described. As shown in FIG. 1, the in-vehicle system 1 includes a smart ECU 11, a BLE communication device 12, a door button 14, a start button 15, a radar ECU 16, a millimeter wave radar 17, an engine ECU 18, a body ECU 19, an autonomous driving ECU 20, and an air conditioner ECU 21. The ECU in the member name is an abbreviation for electronic control unit and means an electronic control device. The BLE is an abbreviation for Bluetooth Low Energy.

The various ECUs included in the in-vehicle system 1 are connected to a communication network Nw constructed in the vehicle as nodes. These nodes connected to the communication network Nw can communicate with each other. Specific nodes may be configured to be able to communicate directly with each other without going through the communication network Nw. For example, the smart ECU 11 and the engine ECU 18 may be directly electrically connected by a dedicated line. In FIG. 1, the communication network Nw is configured as a bus type, but the present disclosure is not limited to the above configuration. The network topology may be a mesh type, a star type, a ring type, or the like. A network shape can be changed as appropriate. As the standard of the communication network Nw, various standards such as Controller Area Network (hereinafter, CAN: registered trademark), Ethernet (Ethernet is a registered trademark), FlexRay (registered trademark), and the like can be employed.

The smart ECU 11 estimates the position of the mobile terminal 3 (hereinafter, also referred to as the terminal position) cooperative with the BLE communication device 12 or the like (in other words, cooperation). The smart ECU 11 realizes vehicle control according to the estimation result of the position of the mobile terminal 3 in cooperation with other ECUs. The smart ECU 11 is realized by using a computer. That is, the smart ECU 11 includes a processor 111, a RAM 112, a storage 113, an I-O 114, a bus line connecting these configurations, and the like. The BLE communication device 12 is built in the smart ECU 11 of the present embodiment.

The processor 111 is hardware (in other words, an arithmetic core) for calculation processing combined with the RAM 112. The processor 111 is, for example, a CPU. The processor 111 executes various processes for realizing a function of each of functional units described later by accessing the RAM 112. The RAM 112 is a volatile storage medium. The storage 113 is configured to include a non-volatile storage medium such as a flash memory. The storage 113 stores a program (for example, a position estimation program) executed by the processor 111. Executing the position estimation program by the processor 111 corresponds to executing a method (corresponding to the position estimation method) corresponding to the position estimation program. The I-O 114 is a circuit module for communicating with another device. The I-O 114 is realized by using an analog circuit element, an IC, or the like.

A terminal ID assigned to the mobile terminal 3 owned by the user is registered in the storage 113. The storage 113 stores data (hereinafter, mounting position data) indicating the mounting position and posture of each BLE communication device 12 in the vehicle Hv. The mounting position of each BLE communication device 12 may be expressed as, for example, a point on two-dimensional coordinates (hereinafter, vehicle two-dimensional coordinate system) centered on any position of the vehicle Hv and parallel to both the width direction and the front-rear direction of the vehicle Hv. An X-axis forming the vehicle two-dimensional coordinate system may be parallel to the front-rear direction of the vehicle, and a Y-axis may be parallel to the vehicle width direction. The center of the two-dimensional coordinate system may be, for example, a center of a rear wheel axle. In the present embodiment, as a more preferable mode, a unique communication device number is set for each BLE communication device 12. The communication device number functions as information for identifying multiple BLE communication devices 12. In the storage 113, the installation position of each BLE communication device 12 is stored as the mounting position data in association with the communication device number. Details of the functions of the smart ECU 11 will be described later.

Figure 2:
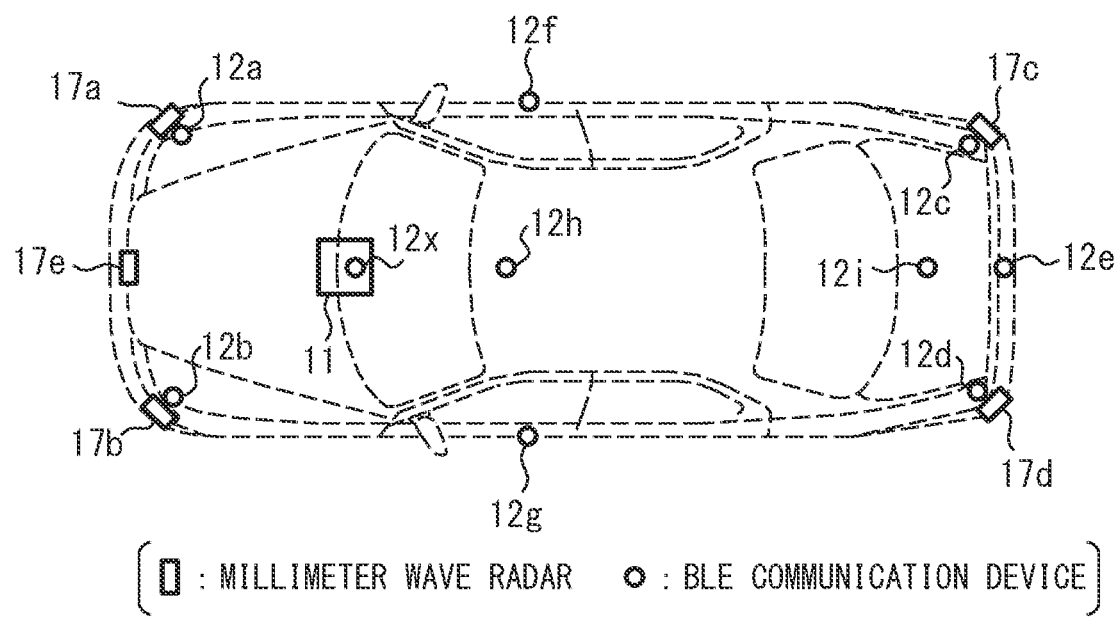
FIG. 2 is a view showing an example of a mounting position of a BLE communication device and a millimeter wave radar in a vehicle.

The BLE communication device 12 is a communication module for performing wireless communication with the mobile terminal 3 in accordance with the BLE standard. At least one BLE communication device 12 is provided in the vehicle. In the present embodiment, as an example, one BLE communication device 12 is built in the smart ECU 11. Multiple BLE communication devices 12 are also distributed and disposed outside the smart ECU 11 at multiple locations in the vehicle. In the present embodiment, as an example, as shown in FIG. 2, BLE communication devices 12a to 12i and a BLE communication device 12x are provided.

The BLE communication device 12a is provided at a right corner portion of a front bumper. The BLE communication device 12b is provided at a left corner portion of the front bumper. The BLE communication device 12c is provided at a right corner portion of a rear bumper. The BLE communication device 12d is provided at a left corner portion of the rear bumper. The BLE communication device 12e is disposed at a center portion of the rear bumper in the left-right direction. The mounting position of the BLE communication device 12e may be the vicinity of a rear license plate, the vicinity of a rear window, the vicinity of a door handle for the trunk, or the like. In the description of the mounting position of the BLE communication device 12, the "vicinity" of a certain member refers to a range within, for example, 30 cm from the member. For example, the vicinity of the license plate means a range within 30 cm from the license plate. The inside of the door handle is also included in the vicinity of the door handle.

The BLE communication device 12f is provided on the door for the front seat on the right side (hereinafter, the front right door). For example, the BLE communication device 12f is disposed in the vicinity of the outer door handle of the front right door. As another mode, the BLE communication device 12f may be disposed in the vicinity of the right front wheel. The BLE communication device 12f may be disposed at a rocker portion under the front right door, a right B pillar, a portion of the roof portion of the vehicle Hv with which the upper end portion of the front right door comes into contact, or the like. The rocker portion also includes the inner portion of the side sill cover. The BLE communication device 12f may be disposed on the rear seat outdoor handle on the right side or the C pillar on the right side. The BLE communication device 12g is disposed on the left surface portion at a position similar to that of the BLE communication device 12f (in other words, laterally symmetrical). For example, the BLE communication device 12g is provided on the door of the front seat on the left side (hereinafter referred to as the front left door).

The BLE communication device 12h is disposed, for example, in the center console. The installation position of the BLE communication device 12h may be disposed, for example, at the foot of the driver's seat or on the side surface of the door for the driver's seat inside the vehicle cabin. The BLE communication device 12h is preferably provided at a position where the outside of the vehicle cabin is out of sight. The BLE communication device 12h may be disposed at a position where the outside of the vehicle cabin can be seen through a window portion such as a ceiling portion inside the vehicle cabin or an overhead console. The BLE communication device 12i is disposed at the center portion of the floor portion of the luggage compartment.

What is out of sight for a certain BLE communication device 12 is a region where the signal transmitted from the BLE communication device 12 does not directly reach. Since a propagation path of the radio signal is reversible, in other words, what is out of sight for a certain BLE communication device 12 corresponds to a region where the BLE communication device 12 cannot directly receive the signal transmitted from the mobile terminal 3. The signal transmitted from the BLE communication device 12 can also reach out of sight by being reflected by various structures. That is, even when the mobile terminal 3 is present out of sight of the BLE communication device 12, both can perform wireless communication due to reflection, diffraction, or the like on the structure.

The BLE communication devices 12a to 12d correspond to the BLE communication devices 12 provided inside the front-rear bumper. The BLE communication devices 12a to 12g correspond to the vehicle exterior communication devices which are the BLE communication devices 12 provided on the outer side surface of the vehicle. The BLE communication devices 12h to 12i correspond to in-vehicle communication devices which are the BLE communication devices 12 provided inside the vehicle cabin.

The BLE communication device 12x is built in the smart ECU 11. The smart ECU 11 is accommodated, for example, inside the instrument panel. As the accommodation location of the smart ECU 11, the inside of the upper surface portion of the instrument panel, the inside of the center garnish, or the like can be employed. The smart ECU 11 may be disposed such that the BLE communication device 12x can communicate with the mobile terminal 3 outside the vehicle cabin in the vicinity of the vehicle, or inside the vehicle cabin. The BLE communication device 12x can also be included in the in-vehicle communication device.

The BLE communication device 12x is a BLE communication device 12 that has already performed the key exchange protocol (so-called pairing) with the mobile terminal 3 based on the operation of the user or the like. The information about the mobile terminal 3 (hereinafter referred to as terminal information) acquired by pairing is stored in the non-volatile memory included in the communication microcomputer 125. The terminal information is, for example, the key exchanged by pairing, the terminal ID, or the like. When the vehicle Hv is shared by multiple users, the terminal information of the mobile terminal 3 owned by each user is stored. When the vehicle Hv is a service car, the terminal information may be distributed from the server and temporarily stored.

When receiving the advertisement signal from the mobile terminal 3, the BLE communication device 12x automatically establishes a communication connection with the mobile terminal 3 using the stored terminal information. Then, the smart ECU 11 performs encrypted data communication with the mobile terminal 3. When establishing the communication connection with the mobile terminal 3, the BLE communication device 12 provides the smart ECU 11 with the terminal ID of the mobile terminal 3 which is in communication connection.

The installation position of each BLE communication device 12 can be changed as appropriate. The number of the BLE communication devices 12 included in the in-vehicle system 1 may be 9 or less, such as 3 or 5, or 10 or more, such as 12. The in-vehicle system 1 may include the BLE communication device 12 disposed inside the front grill (for example, behind the front emblem). The BLE communication device 12 may be disposed on the rooftop or the like.

Each BLE communication device 12 provided outside the smart ECU 11 is connected to the smart ECU 11 so as to be able to communicate with each other via a dedicated communication line or the communication network Nw. The specific configuration of the BLE communication device 12 will be described later separately.

The door button 14 is a button for the user to unlock and lock the door of the vehicle Hv. It may be provided at or in the vicinity of the outer door handle provided on the vehicle Hv. When being pressed by the user, the door button 14 outputs an electric signal indicating the effect to the smart ECU 11. The door button 14 corresponds to a configuration for the smart ECU 11 to receive the user's unlocking instruction and locking instruction. A touch sensor may be employed as a configuration for receiving at least one of the unlocking instruction and the locking instruction from the user. The touch sensor is a device that detects that the user is touching the door handle.

The start button 15 is a push switch for the user to start a driving source (for example, an engine). When the push operation is performed by the user, the start button 15 outputs an electric signal indicating the effect to the smart ECU 11. As an example, the vehicle Hv is set to a vehicle provided with an engine as a power supply, but the present disclosure is not limited to the above example. The vehicle Hv may be an electric vehicle or a hybrid vehicle. When the vehicle Hv is a vehicle equipped with a motor as a driving source, the start button 15 corresponds to a switch for setting the system main relay to be turned on and starting the traveling motor. The start button 15 corresponds to an operation member for the user to switch on-off (hereinafter, also referred to as power on-off) of a traveling power supply such as an ignition power supply or the system main relay.

The radar ECU 16 is an ECU that controls the operation of the millimeter wave radar 17. The radar ECU 16 is mainly configured of a microcomputer (hereinafter referred to as a microcomputer 161). The radar ECU 16 operates the millimeter wave radar 17 based on, for example, the ignition power supply being turned on. For example, the radar ECU 16 operates the millimeter wave radar 17 when the vehicle Hv is traveling and temporarily stopped. When the vehicle Hv is traveling, the time of automatic parking and the time of automatic exiting are also included.

The radar ECU 16 of the present embodiment is configured to operate the millimeter wave radar 17 while the ignition power supply is turned on for simplification of control. Therefore, the millimeter wave radar 17 is also operated even when the air conditioner ECU 21 executes the preliminary air conditioning operation described later. As another configuration, the radar ECU 16 may be configured to have a scene in which the millimeter wave radar 17 is not operated even when the ignition power supply is turned on. The radar ECU 16 can change the operation setting of the millimeter wave radar 17, and also provides the smart ECU 11 and the like with radar operation information indicating a detailed operation state of each millimeter wave radar 17. The radar operation information includes information such as transmission interval, transmission timing, and pause period. The radar ECU 16 outputs the detection result of the millimeter wave radar 17 to the autonomous driving ECU 20 or the like.

The millimeter wave radar 17 is a device that transmits millimeter waves or quasi-millimeter waves as probe waves in a predetermined direction, and analyzes the reception data of the reflected waves returned by the transmission waves reflected by an object to detect a relative position and a relative speed of an object with respect to the vehicle Hv. As the frequency band of the probe wave, for example, a 24 GHz band (21.65-26.65 GHZ), a 60 GHz band (60-61 GHZ), a 76 GHz band (76-77 GHZ), and a 79 GHz band (77-81 GHZ) can be employed. As the probe wave, millimeter waves of 94.7-95 GHZ (94 GHz band), 136 to 148.5 GHZ, and 139-140 (140 GHz band) can also be employed. The quasi-millimeter wave refers to an electromagnetic wave having a wavelength of about 10 mm to 15 mm in the air.

Figure 3:
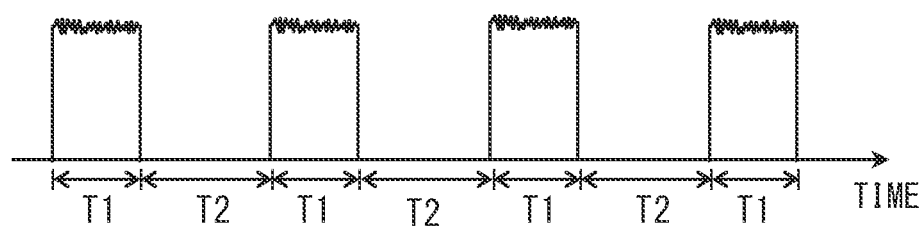
FIG. 3 is a diagram showing an operating mode of the millimeter wave radar.

As shown in FIG. 3, each millimeter wave radar 17 repeats a transmission and reception period for transmitting the probe wave and a pause period for stopping the transmission of the probe wave at a predetermined cycle during operation. During the transmission and reception period, the reception of the reflected wave is also performed. A reception circuit may continue to operate even during the pause period. A transmission and reception period length T1 is set to, for example, 20 milliseconds, and a pause period length T2 is set to, for example, 30 milliseconds. T1 may be 10 milliseconds or 30 milliseconds. T2 may also be 20 milliseconds or 10 milliseconds. T1 and T2 may be changed according to the traveling scene. A total value of the transmission and reception period and the pause period (in other words, their cycle) corresponds to the transmission interval. The millimeter wave radar 17 generates, for example, data indicating the reception strength and the relative speed for each detection direction and distance or data indicating the relative position and reception strength of the detected object as the detection result.

The millimeter wave radar 17 is disposed at multiple locations in the vehicle Hv. As an example, the in-vehicle system 1 includes millimeter wave radars 17a to 17e. The millimeter wave radar 17a is provided at the right corner portion of the front bumper. The millimeter wave radar 17b is provided at the left corner portion of the front bumper. The millimeter wave radar 17c is provided at the right corner portion of the rear bumper. The millimeter wave radar 17d is provided at the left corner portion of the rear bumper. The millimeter wave radar 17e is disposed inside the front grill, for example, behind the emblem. The millimeter wave radar 17e corresponds to the millimeter wave radar 17 provided at the center portion of the tip portion of the vehicle in the left-right direction. The millimeter wave radar 17e may be the center portion of the front bumper.

The above BLE communication device 12a is disposed in the vicinity of the millimeter wave radar 17a, and the BLE communication device 12b is disposed in the vicinity of the millimeter wave radar 17b. The BLE communication device 12c is disposed in the vicinity of the millimeter wave radar 17c, and the BLE communication device 12d is disposed in the vicinity of the millimeter wave radar 17d.

The vicinity of the millimeter wave radar 17 refers to a range in which the millimeter wave radar 17 and the BLE communication device 12 can interfere with each other. Specifically, a spurious component of one of the millimeter wave radar 17 and the BLE communication device 12 corresponds to a range that can be given to the operation of the other. For example, the region within 10 cm from the millimeter wave radar 17a can be regarded as the vicinity of the millimeter wave radar 17a. A length defining the vicinity region of the millimeter wave radar 17 is not limited to 10 cm, and may be 5 cm, 15 cm, or 20 cm. The length defining the vicinity region can be set in consideration of the transmission power of the radio waves of the millimeter wave radar 17 and the BLE communication device 12, the required reception sensitivity, and the directivity. Hereinafter, the BLE communication device 12 disposed in the vicinity of the millimeter wave radar 17, such as the BLE communication devices 12a to 12d, is also referred to as a radar vicinity device. The radar vicinity device here is a concept that refers to a communication device for short-range communication disposed in the vicinity of the millimeter wave radar 17, and includes not only the BLE communication device 12 but also the UWB communication device 22 which is described late.

The number of the millimeter wave radars 17 and mounting positions thereof included in the in-vehicle system 1 can be changed as appropriate. For example, there may be a millimeter wave radar 17 attached to the cabin inner side surface at the upper end portion of the front windshield. There may be a millimeter wave radar 17 attached to a side sill, a side mirror, or the like. The millimeter wave radar 17 may be disposed on the rooftop or the like. In order to accurately detect an object by transmitting and receiving the probe waves, the millimeter wave radar 17 is mounted on a location such as the front bumper or the rear bumper where the radio wave environment is good.

The engine ECU 18 is an ECU that controls the operation of an engine mounted on the vehicle Hv. For example, when acquiring a start instruction signal for instructing the engine to start from another ECU (for example, the smart ECU 11 or the body ECU 19), the engine ECU 18 starts the engine.

The body ECU 19 is an ECU that controls a body system actuator 191 based on a request from the smart ECU 11 or the user. The body ECU 19 is communicably connected to various body system actuators 191 and various body system sensors 192. The body system actuator 191 here is, for example, a door lock motor constituting a locking mechanism for each door, an actuator for adjusting the seat position (hereinafter referred to as a seat actuator), and the like. The body system sensor 192 includes a courtesy switch and the like disposed for each door. The courtesy switch is a sensor for detecting opening and closing of the door. The body ECU 19 locks or unlocks each door by outputting a predetermined control signal to a door lock motor provided on each door of the vehicle Hv, for example, based on a request from the smart ECU 11.

The autonomous driving ECU 20 is an ECU that autonomously travels the vehicle Hv based on the detection result of the surrounding monitoring sensor that detects an object existing around the vehicle. The surrounding monitoring sensor includes the millimeter wave radar 17, a sonar, a camera, a LiDAR, or the like. Autonomous traveling refers to the automatic execution of all driving operations such as steering, acceleration and deceleration, and shift change. The autonomous driving ECU 20 executes automatic parking control for autonomously traveling and parking the vehicle Hv toward, for example, a parking space detected by a surrounding monitoring sensor or a parking position designated by the user. The automatic exiting control is executed, in which the vehicle Hv in the parking state is powered on and autonomously traveled to the position designated by the user or near the user by being triggered by a predetermined user operation. The autonomous driving ECU 20 is configured to executable automatic parking control and automatic exiting control, for example, on condition that the user is present within a predetermined distance from the vehicle Hv.

The air conditioner ECU 21 is an ECU that controls an air conditioner mounted on the vehicle Hv. The air conditioner ECU 21 includes a microcomputer as a hardware element. An in-vehicle air conditioner is a device that provides a cooling function and a heating function. The air conditioner ECU 21 is configured to be capable of performing pre-ride air conditioning operation (hereinafter referred to as preliminary air conditioning operation) that is performed before an occupant boards the vehicle. The air conditioner ECU 21 operates the in-vehicle air conditioning device as the preliminary air conditioning operation based on an air conditioning schedule set in advance by the user. For example, when receiving a request signal of the preliminary air conditioning operation transmitted from an external device such as a mobile terminal 3 via a wide area communication device, the air conditioner ECU 21 performs a calculation by a predetermined program to execute the preliminary air conditioning operation. The operation mode (heating-cooling), target temperature, air volume, and the like in the preliminary air conditioning operation are determined based on the request signal and the presetting contents. The request signal of the preliminary air conditioning operation can be transmitted by the user operating the mobile terminal 3 in which predetermined application software for instructing the preliminary air conditioning operation is installed. With the above configuration, the user can operate the air conditioner for cooling-heating from, for example, 10 minutes before the scheduled boarding time. In order to restrict the battery exhaustion, the air conditioner ECU 21 of the present embodiment turns on the ignition power supply in cooperation with the engine ECU 18 during the preliminary air conditioning operation.

<Details of Configuration of BLE Communication Device 12>

Figure 4:
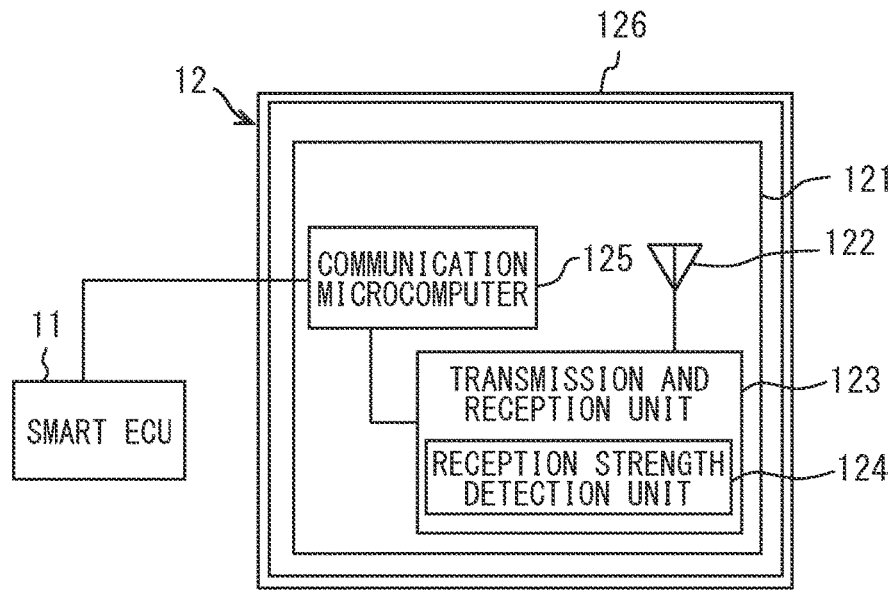
FIG. 4 is a diagram showing a configuration of the BLE communication device.

FIG. 4 schematically shows an electrical configuration of the BLE communication device 12. As shown in FIG. 4, the BLE communication device 12 includes a substrate 121, an antenna 122, a transmission and reception unit 123, a communication microcomputer 125, and a housing 126. The substrate 121 is, for example, a printed circuit board. The substrate 121 is provided with electronic components such as the antenna 122 that constitute the BLE communication device 12.

The antenna 122 is an antenna for transmitting and receiving radio waves in a frequency band (for example, 2.4 GHz band) used for short-range communication (here, BLE communication). In the present embodiment, the antenna 122 is an omnidirectional antenna as an example. As another mode, the antenna 122 may have directivity. The antenna 122 is electrically connected to the transmission and reception unit 123. The antenna 122 may be configured as an array antenna in which multiple antenna elements are arranged side by side. The substrate 121 corresponds to the circuit board.

The transmission and reception unit 123 demodulates a signal received by the antenna 122 and provides the signal to the communication microcomputer 125. The signal input from the smart ECU 11 is modulated via the communication microcomputer 125, output to the antenna 122, and radiated as a radio wave. The transmission and reception unit 123 is connected to the communication microcomputer 125 so as to be able to communicate with each other. The transmission and reception unit 123 includes a reception strength detection unit 124 that sequentially detects the intensity of the signal received by the antenna 122. The reception strength detected by the reception strength detection unit 124 is sequentially provided to the communication microcomputer 125 in association with the terminal ID included in the reception data.

The communication microcomputer 125 is a microcomputer that controls the transfer of data to and from the smart ECU 11. The communication microcomputer 125 is realized by using an MPU, a RAM, a ROM, or the like. The communication microcomputer 125 provides the reception data input from the transmission and reception unit 123 to the smart ECU 11 sequentially or based on a request from the smart ECU 11. The communication microcomputer 125 has a function of authenticating the terminal ID of the mobile terminal 3 and performing encrypted communication with the mobile terminal 3 based on the request from the smart ECU 11. As an encryption method, various methods such as a method defined by Bluetooth can be used. Various methods, such as the method defined in Bluetooth, can also be used for the ID-authentication method.

When acquiring the reception strength data from the reception strength detection unit 124, the communication microcomputer 125 accumulates the reception strength data in a RAM (not shown). The reception strength data sequentially acquired may be sorted in chronological order and stored in the RAM so that the reception strength of the latest reception data becomes a head, for example. Data that have passed a certain period of time after being stored are sequentially discarded. The reception strength data is held in the RAM for a certain period of time. The communication microcomputer 125 provides the reception strength data accumulated in the RAM based on the request from the smart ECU 11. The reception strength data may be sequentially provided to the smart ECU 11 regardless of whether there is a request from the smart ECU 11.

<About Function of Smart ECU 11>

Figure 5:
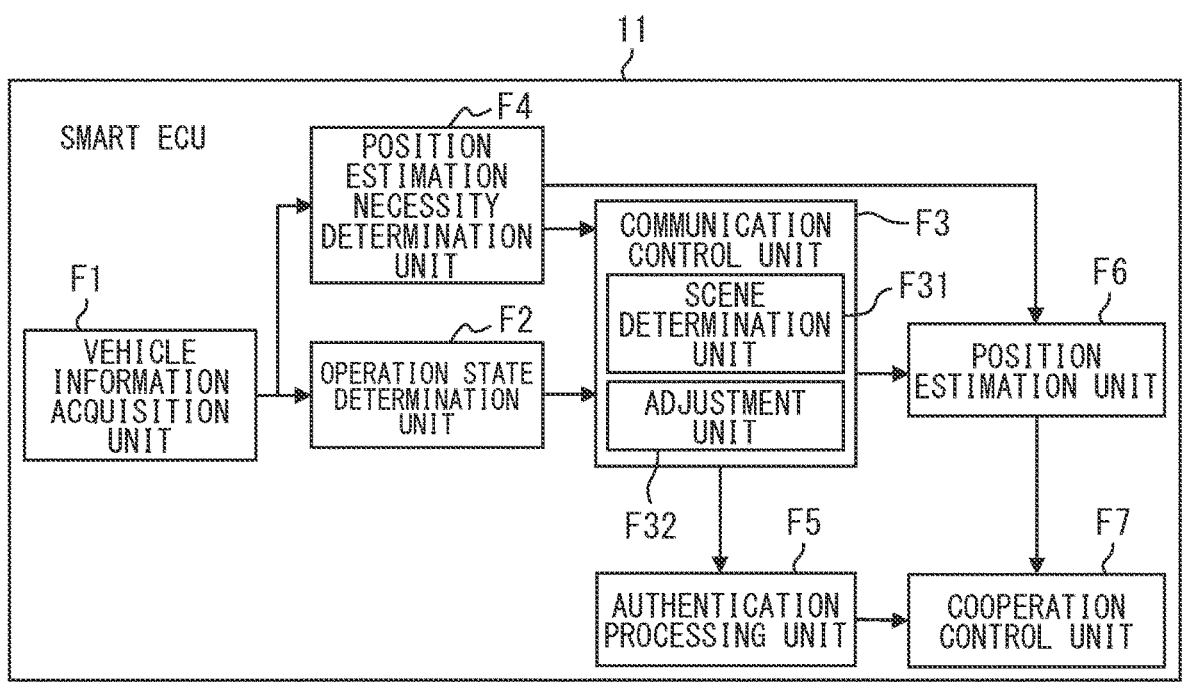
FIG. 5 is a functional block diagram showing a configuration of a smart ECU.

A function and an operation of the smart ECU 11 will be described with reference to FIG. 5. The smart ECU 11 provides functions corresponding to various functional blocks shown in FIG. 5 by executing a program stored in the storage 113. That is, the smart ECU 11 includes, as functional blocks, a vehicle information acquisition unit F1, a operation state determination unit F2, a communication control unit F3, a position estimation necessity determination unit F4, an authentication processing unit F5, a position estimation unit F6, and a cooperation control unit F7. The communication control unit F3 includes a scene determination unit F31 and an adjustment unit F32.

The vehicle information acquisition unit F1 acquires various information (hereinafter, vehicle information) indicating the state of the vehicle Hv from sensors, ECUs (for example, engine ECU 18 and body ECU 19), switches, and the like mounted on the vehicle Hv. The vehicle information corresponds to, for example, the state of the vehicle power supply, the opening and closing state of each door, the locking and unlocking state of each door, the presence and absence of pressing of the door button 14, the presence and absence of pressing of the start button 15, the shift position, and the like. The state of the vehicle power supply includes whether the ignition power supply is turned on. The vehicle information acquisition unit F1 acquires the operation mode of the autonomous driving ECU 20 (for example, whether the operation mode is automatic parking or exiting). The vehicle information acquisition unit F1 acquires information on the preliminary air conditioning operation, such as whether the preliminary air conditioning operation is being executed, from the air conditioner ECU 21.

The vehicle information acquisition unit F1 specifies the current state of the vehicle Hv based on the various information described above. For example, the vehicle information acquisition unit F1 determines that the vehicle Hv is parked when the engine is turned off and all the doors are locked. The conditions for determining that the vehicle Hv is parked may be appropriately designed, and various determination conditions can be applied. The acquisition of the information indicating the locking and unlocking state of each door corresponds to the determination of the locking and unlocking state of each door and the detection of the locking operation-unlocking operation of the door by the user. Acquiring the electric signals from the door button 14 and the start button 15 corresponds to detecting the user operation for these buttons. That is, the vehicle information acquisition unit F1 corresponds to a configuration that detects the user operation on the vehicle Hv, such as opening and closing the door, pressing the door button 14, or pressing the start button 15. The vehicle information can also include user operations on the vehicle Hv. The types of information included in the vehicle information are not limited to those described above. The vehicle information also includes a shift position detected by a shift position sensor (not shown), a detection result of a brake sensor for detecting whether a brake pedal is depressed, and the like. The operation state of the parking brake can also be included in the vehicle information.

The operation state determination unit F2 determines whether the current status corresponds to a status in which the millimeter wave radar 17 operates (hereinafter, a millimeter wave operation scene), based on the vehicle information acquired by the vehicle information acquisition unit F1. For example, when the ignition power supply is turned on, the current status is determined to correspond to a millimeter wave operation scene. The operation state determination unit F2 may determine that the current status is the millimeter wave operation scene when the autonomous driving ECU 20 executes the automatic parking control and automatic exiting control. The operation state determination unit F2 may determine that the current status is the millimeter wave operation scene when the air conditioner ECU 21 executes the preliminary air conditioning operation. The operation state determination unit F2 communicates with the radar ECU 16 and the millimeter wave radar 17 acquires information indicating the operation state from the radar ECU 16, and thereby the operation state determination unit F2 may also determine whether the millimeter wave radar is in operation. Determining whether the current status is the millimeter wave operation scene includes determining whether the millimeter wave radar 17 is in operation.

The smart ECU 11 including the operation state determination unit F2 is configured to be able to acquire detailed information on the operating situation of each millimeter wave radar 17 as radar operation information from the radar ECU 16. The acquisition source of the radar operation information may not be the radar ECU 16. For example, the acquisition source may be the surrounding monitoring ECU, the autonomous driving ECU 20, or the like. When the autonomous driving ECU 20 is connected to the millimeter wave radar 17, the radar operation information may be acquired from the autonomous driving ECU 20. The smart ECU 11 may acquire a signal indicating the operation state from the millimeter wave radar 17. The operation state determination unit F2 corresponds to the radar operation state determination unit.

The communication control unit F3 is configured to control the operation of the BLE communication device 12. The communication control unit F3 performs data communication with the mobile terminal 3 using any BLE communication device 12 (here, the BLE communication device 12x). For example, the communication control unit F3 generates data addressed to the mobile terminal 3 and outputs the data to the BLE communication device 12x. Accordingly, the communication control unit F3 transmits a signal corresponding to desired data as a radio wave. The communication control unit F3 receives the data from the mobile terminal 3 received by the BLE communication device 12x. In the present embodiment, as a more preferable mode, the wireless communication between the smart ECU 11 and the mobile terminal 3 is configured to be encrypted and performed.

The communication control unit F3 recognizes that the user is present around the vehicle Hv based on the fact that the communication connection with the mobile terminal 3 is established. The communication control unit F3 acquires the terminal ID of the mobile terminal 3 to which the BLE communication device 13 is in communication connection from the BLE communication device 12x. According to such a configuration, even if the vehicle Hv is a vehicle shared by multiple users, the smart ECU 11 can specify the user who is present around the vehicle Hv based on the terminal ID of the mobile terminal 3 to which the BLE communication device 12 is connected by communication.

In addition, the communication control unit F3 acquires data indicating the reception status of the signal from the mobile terminal 3, from each BLE communication device 12. For example, the communication control unit F3 acquires data indicating the reception strength of the terminal signal as the reception status of the signal from the mobile terminal 3. As the information indicating the reception status of the signal of the mobile terminal 3, reception direction data indicating an arrival direction of the signal, a flight time of the signal transmitted by the mobile terminal 3, a round trip time until a response signal is received after a response request signal is transmitted, or the like can be employed. The arrival direction can be estimated by configuring the antenna 122 as an array antenna and applying various arrival direction analysis processes such as the MUSIC method to the reception result of the antenna 122. The communication control unit F3 also provides the communication status of each BLE communication device 12 with the mobile terminal 3 to other function and circuit modules such as the position estimation necessity determination unit F4 and the position estimation unit F6.

Based on the determination result of the position estimation necessity determination unit F4, the scene determination unit F31 determines whether the current status is a simultaneous operation scene in which both the millimeter wave radar 17 and the radar vicinity device can operate simultaneously. Various information from the sensor mounted on the vehicle Hv is used for the position estimation necessity determination unit F4. Therefore, the scene determination unit F31 corresponds to a configuration for determining whether the current status is a simultaneous operation scene based on various information from the sensor mounted on the vehicle Hv. The operation of the scene determination unit F31 will be described later.

The adjustment unit F32 changes the operating mode of the BLE communication device 12 so that the interference between the millimeter wave radar 17 and the BLE communication device 12 is restricted. The communication control unit F3 including the adjustment unit F32 and the processor 111 as the communication control unit F3 correspond to an example of the operating mode changing unit. The operation of the adjustment unit F32 will be described later.

The position estimation necessity determination unit F4 determines whether the current status is a scene in which the position of the mobile terminal 3 needs to be estimated (hereinafter, a position estimation scene), based on the vehicle information acquired by the vehicle information acquisition unit F1 and the communication status between the BLE communication device 12 and the mobile terminal 3 provided by the communication control unit F3. Determining whether the current status is the position estimation scene corresponds to determining whether the position of the mobile terminal 3 needs to be estimated.

For example, the position estimation necessity determination unit F4 determines that the current status is the position estimation scene when the communication connection between the mobile terminal 3 and the BLE communication device 12x is established in the parking state. After the communication connection, the determination that the current status is the position estimation scene may be maintained from that time point until a predetermined period elapses or until the power is turned on. The position estimation necessity determination unit F4 may determine that the current status is the position estimation scene when the advertisement signal from the mobile terminal 3 is received. The position estimation necessity determination unit F4 may determine that the current status is the position estimation scene when the opening or closing of the door is detected in a state where the ignition power supply is turned on.

The position estimation necessity determination unit F4 may determine that the current status is the position estimation scene when the autonomous driving ECU 20 executes the automatic parking control and the automatic exiting control. Once the current status is determined to correspond to the position estimation scene, the determination result may be maintained for a predetermined time (for example, 1 minute) from the determination time point. The position estimation necessity determination unit F4 may always continue to determine that the current status is the position estimation scene while the communication connection between the mobile terminal 3 and the BLE communication device 12x is established. The position estimation necessity determination unit F4 may determine that the current status is the position determination scene when the vehicle Hv is stopped or traveling at low speed, and determine that the current status is not the position determination scene when the vehicle Hv is traveling normally. The traveling at low speed means a state where the vehicle speed is equal to or lower than a predetermined first speed (for example, 30 km/h), and the normal traveling means a state where the vehicle speed exceeds the first speed. Traveling at low speed includes traveling by the automatic parking control and the automatic exiting control. The traveling at low speed includes the time of backward traveling, during traveling for detecting the parking space, and the time of the parking support. Even during normal traveling, the position estimation necessity determination unit F4 may determine that the current status is the position estimation scene every predetermined time period or every time the authentication of the mobile terminal 3 expires.

The authentication processing unit F5 cooperates with the BLE communication device 13 to perform a process of confirming (in other words, authenticating) that a communication partner is the mobile terminal 3 of the user. The communication for authentication is encrypted via the BLE communication device 13 and performed. That is, the authentication process is performed by encrypted communication. The authentication process itself may be performed by use of various methods such as a challenge-response method. A detailed description of the authentication process will be omitted in this example. It is assumed that the data (for example, the encryption key) required for the authentication process is set to data stored in each of the mobile terminal 3 and the smart ECU 11. The timing at which the authentication processing unit F5 performs the authentication process may be, for example, the timing at which the communication connection between the BLE communication device 13 and the mobile terminal 3 is established. The authentication processing unit F5 may be configured to perform the authentication process at a predetermined cycle while the BLE communication device 13 and the mobile terminal 3 are connected by communication. The encrypted communication for the authentication process may be configured to be performed by using a predetermined user operation on the vehicle Hv as a trigger, such as when the start button 15 is pressed by the user or when the door is opened or closed.

By the way, the fact that the communication connection between the BLE communication device 13 and the mobile terminal 3 is established in the Bluetooth standard means that the communication partner of the BLE communication device 13 is the mobile terminal 3 registered in advance. Therefore, the smart ECU 11 may be configured to determine that the authentication of the mobile terminal 3 is successful based on the establishment of the communication connection between the BLE communication device 13 and the mobile terminal 3.

The position estimation unit F6 is configured to execute a process of estimating the position of the mobile terminal 3 (hereinafter, terminal position estimation process), in response to the determination by the position estimation necessity determination unit F4 that the current status is the position estimation scene. The position estimation unit F6 sequentially executes, for example, the terminal position estimation process at predetermined estimation intervals while the position estimation scene is determined. The estimation interval can be, for example, 100 milliseconds. The estimation interval may be 200 milliseconds, 150 milliseconds, or the like. Estimating the position of the mobile terminal 3 corresponds to estimating the position of the user. The position estimation process by the position estimation unit F6 will be described later separately.

The cooperation control unit F7 is configured to execute the vehicle control according to the position of the mobile terminal 3 (in other words, the user) and the state of the vehicle Hv in cooperation with the body ECU 19 and the like under the condition that the authentication of the mobile terminal 3 by the authentication processing unit F5 is successful. The state of the vehicle Hv is determined by the vehicle information acquisition unit F1. The position of the mobile terminal 3 is determined by the position estimation unit F6.

For example, when the mobile terminal 3 is present outside the vehicle cabin and the door button 14 is pressed by the user in a status where the vehicle Hv is parked, the cooperation control unit F7 cooperates with the body ECU 19 to unlock the locking mechanism of the door. For example, when the position estimation unit F6 determines that the mobile terminal 3 is present in the vehicle cabin and detects that the start button 15 is pressed by the user, the engine is started in cooperation with the engine ECU 18.

The cooperation control unit F7 sequentially provides the autonomous driving ECU 20 with the terminal position estimated by the position estimation unit F6 while the autonomous driving ECU 20 executes the automatic parking control. When the autonomous driving ECU 20 determines that the user is not present in the predetermined control permission region based on the estimation result of the position estimation unit F6, the autonomous driving ECU 20 and the automatic parking are interrupted or temporarily stopped. As described above, the cooperation control unit F7 is basically configured to execute the vehicle control according to the position of the user and the state of the vehicle Hv by using the user operation on the vehicle Hv as a trigger. However, some of the vehicle controls that can be executed by the cooperation control unit F7 may be automatically executed according to the position of the user without requiring the user operation on the vehicle Hv.

<About Position Estimation Method>

An estimation method of the position of the mobile terminal 3 will be described. Various methods can be employed as the position estimation method. In the present embodiment, a configuration in which the position of the mobile terminal 3 is specified by the RSSI (RSSI: Received Signal Intensity Indicator) method using the reception strength of the signal from the mobile terminal 3 will be described as an example. The RSSI method is a method that estimates a distance from each BLE communication device 12 to the mobile terminal 3 using a characteristic that the electric field intensity of the radio signal is attenuated according to the propagation distance, and estimates the terminal position based on the distance from each BLE communication device 12.

The position estimation unit F6 converts the reception strength information of the signal from the mobile terminal 3 observed by each BLE communication device 12 into distance information, and generates the distance information from each BLE communication device 12 to the mobile terminal 3. The position of the mobile terminal 3 is calculated by integrating the distance information from each BLE communication device 12 to the mobile terminal 3. For example, the position estimation unit F6 specifies the position of the mobile terminal 3 with respect to the reference point of the vehicle Hv by a principle of three-point survey or triangulation based on the distance calculated from each of the reception strengths observed by three or more BLE communication devices 12 and the mounting positions of these BLE communication devices 12. The conversion from the reception strength to the distance information can be realized by using a model formula in which the reception strength is attenuated in inverse proportion to the cube or the square of the distance. The position of the mobile terminal 3 with respect to the vehicle Hv can be expressed as a point in the vehicle two-dimensional coordinate system.

Figure 6:
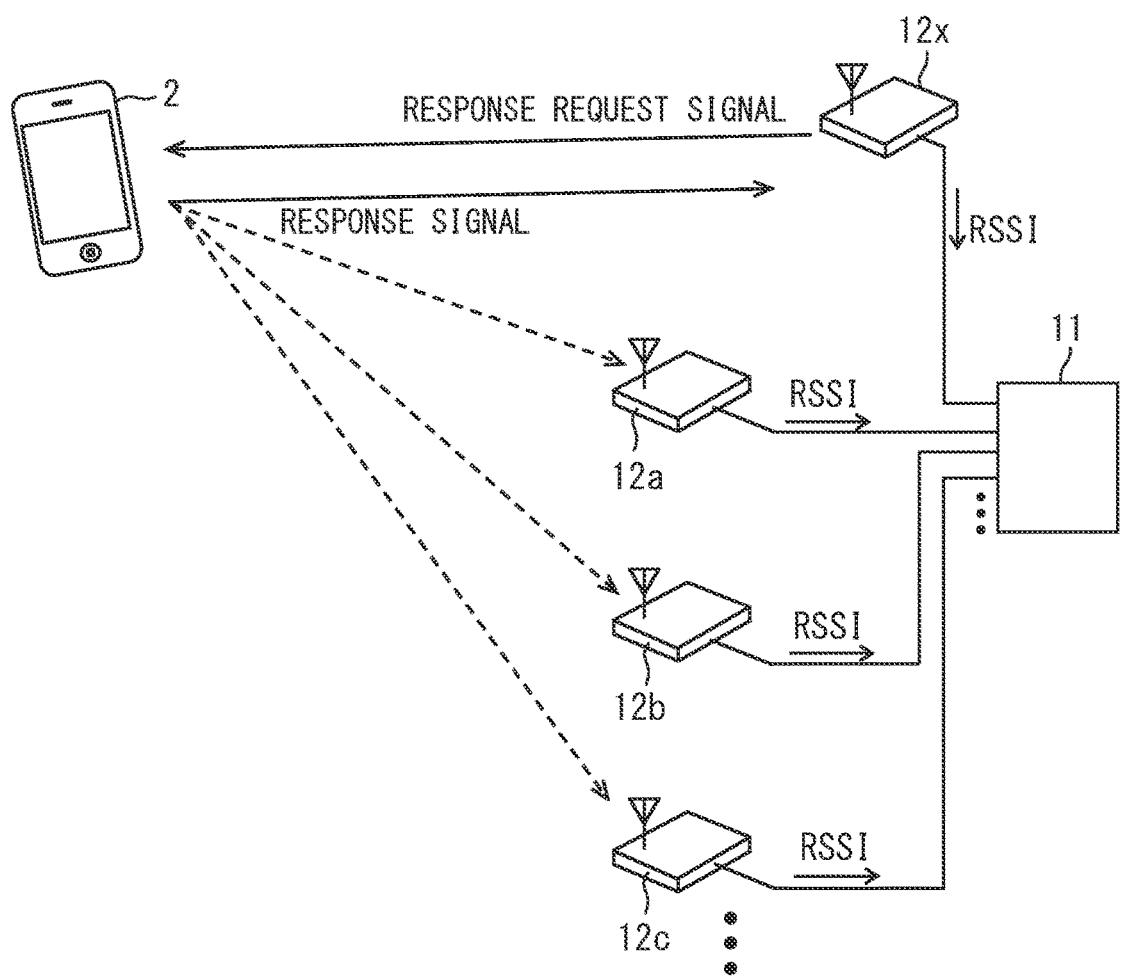
FIG. 6 is a diagram for explaining an estimation method of a position of a mobile terminal.

In performing the position estimation by the RSSI method described above, it is not necessary for all the BLE communication devices 12 to perform bidirectional communication with the mobile terminal 3. As shown in FIG. 6, the BLE communication device 12 other than the BLE communication device 12x may be configured to execute only the observation of the reception strength. For convenience, in a system configuration in which the communication device of the multiple BLE communication devices 12, which performs the bidirectional communication with the mobile terminal 3, is limited to one, the BLE communication device 12, which plays a role of performing the bidirectional communication with the mobile terminal 3, is referred to as a gateway communication device. In the present embodiment, the BLE communication device 12x corresponds to the gateway communication device. FIG. 6 shows a configuration in which the BLE communication device 12x as the gateway communication device is disposed outside the smart ECU 11, and as described above, the BLE communication device 12x is built in the smart ECU 11. The gateway communication device may be the BLE communication device 12 disposed outside the smart ECU 11. The BLE communication device 12 as the gateway communication device may be fixed or may be dynamically changed by the smart ECU 11.

In the state where the communication connection with the mobile terminal 3 is established, the BLE communication device 12 transmits and receives data to and from the mobile terminal 3 while sequentially changing 37 channels. At that time, the gateway communication device (here, the BLE communication device 12x) sequentially provides the communication control unit F3 with information indicating a channel used for communication with the mobile terminal 3 (hereinafter, channel information). The channel information may be a specific channel number, or may be a parameter (so-called hopIncrement) indicating a transition rule of a used channel. The HopIncrement is a number from 5 to 16 that is randomly determined during the communication connection. The channel information preferably includes the current channel number and the HopIncrement.

The smart ECU 11 as the communication control unit F3 distributes the channel information and the terminal ID acquired from the gateway communication device to the BLE communication device 12 (hereinafter, also referred to as an observation device or a hearing device) other than the gateway communication device as reference information. Each observation device can recognize whether it can receive the signal from the mobile terminal 3 when receiving which channel of multiple channels included in the Bluetooth standard by the channel information shown in the reference information. As a result, the reception strength of the signal from the mobile terminal 3 can be detected and reported. The observation device can specify which device should report the reception strength of the signal to the smart ECU 11 even when signals from multiple devices are received by the terminal ID shown in the reference information. In the configuration in which each BLE communication device 12 is set to play a role such as the gateway communication device or the observation device, each observation device may report the reception strength of the signal including the terminal ID shown in the reference information among the signals received in the channel shown in the channel information, to the smart ECU 11.

As another mode, the position estimation unit F6 may specify the position of the mobile terminal 3 with respect to the vehicle Hv using an Angle of Arrival (AoA) method using the arrival angle of the radio wave. The position of the mobile terminal 3 with respect to the vehicle Hv may be specified by using a Time of Flight (ToF) method in which localization is performed by using the flight time of the radio waves. Alternatively, the position of the mobile terminal 3 with respect to the vehicle Hv may be specified by using the Time Difference of Arrival (TDOA) method in which localization is performed by using the arrival time difference of the radio waves. A signal reciprocation time (so-called TOA: Time Of Arrival or RTT: Round-Trip Time), which is the time from the transmission of the response request signal to the reception of the response signal, method may be used.

<About Adjustment Unit F32>

Figure 7:
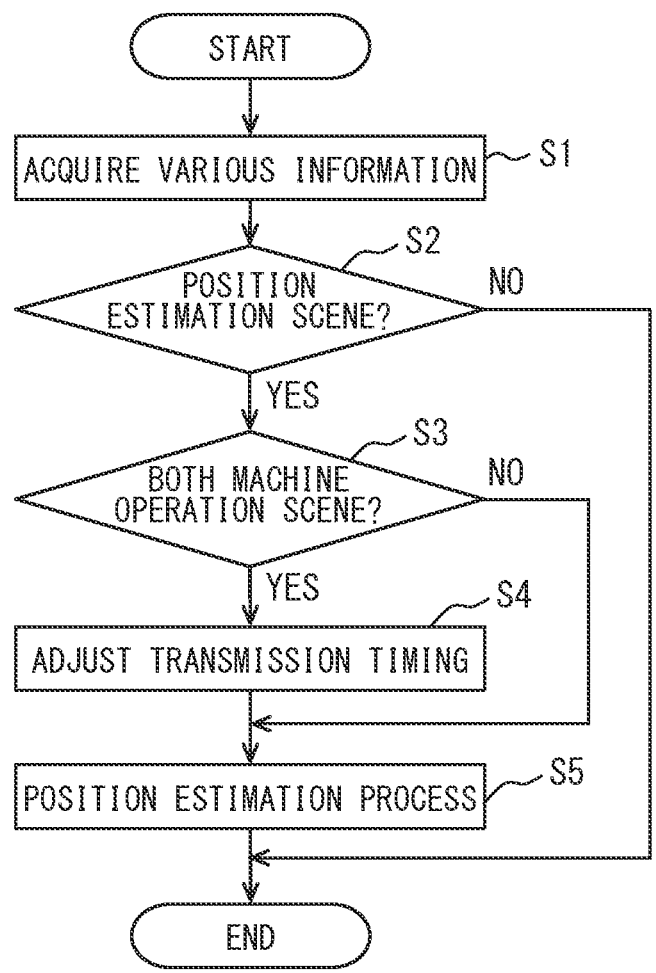
FIG. 7 is a flowchart for explaining an operation of the smart ECU.

The adjustment unit F32 adjusts the communication timing with the mobile terminal 3 so that the interference between the millimeter wave radar 17 and the radar vicinity device is restricted when the scene determination unit F31 determines that the current status is a simultaneous operation scene. FIG. 7 shows a flow of the operation of the smart ECU 11 related to the operation of the adjustment unit F32, and includes steps S1 to S5. The flowchart shown in FIG. 7 is sequentially executed (for example, every 100 milliseconds) while at least one of the multiple BLE communication devices 12 receives the signal from the mobile terminal 3.

In step S1, the vehicle information acquisition unit F1 acquires various vehicle information including the state of the vehicle power supply. In step S1, the communication control unit F3 acquires the communication status with the mobile terminal 3. The communication status with the mobile terminal 3 includes (a) whether the communication connection with the mobile terminal 3 is established, (b) the communication device number of the BLE communication device 12 receiving the signal from the mobile terminal 3, (c) the reception strength of the signal from the mobile terminal 3 in each BLE communication device 12, and the like. When step S1 is completed, the process proceeds to step S2.

In step S2, the position estimation necessity determination unit F4 determines whether the current status corresponds to the position estimation scene based on the vehicle information and the communication status with the mobile terminal 3 acquired in step S1. An example of the criteria for determining whether the current status is the position estimation scene is as described above. When the position estimation necessity determination unit F4 determines in step S2 that the current status corresponds to the position estimation scene, step S3 is executed. Meanwhile, in step S2, when the current status is determined not to correspond to the position estimation scene, the flow ends.

In step S3, the scene determination unit F31 determines whether the current status is the simultaneous operation scene. For example, when the position estimation necessity determination unit F4 determines that the current status is the position estimation scene and the operation state determination unit F2 determines that the current status is the radar operation scene, the scene determination unit F31 determines that the current status is the simultaneous operation scene. A determination as to whether the current status is the position estimation scene has been made in step S2. Therefore, substantially, in step S3, the current status is determined to be the simultaneous operation scene when the operation state determination unit F2 determines that the millimeter wave radar is in operation.

The scene determination unit F31 may directly determine whether the current status is the simultaneous operation scene from the sensor information acquired by the vehicle information acquisition unit F1. For example, the scene determination unit F31 may determine that the current status is the simultaneous operation scene when the opening or closing of the door is detected in a state where the ignition power supply is turned on. The scene determination unit F31 may determine that the current status is the simultaneous operation scene when the BLE communication device 12 receives the signal from the mobile terminal 3 in a status where the air conditioner ECU 21 executes the preliminary air conditioning operation based on the user reservation. The scene determination unit F31 may determine that the current status is the simultaneous operation scene when the automatic parking control or the automatic exiting control is executed. Step S3 corresponds to the scene determination step.

When the scene determination unit F31 determines in step S3 that the current status corresponds to the simultaneous operation scene, step S4 is executed. Meanwhile, when the current status is determined not to correspond to the radar operation scene in step S3, the process proceeds to step S5.

Figure 8:
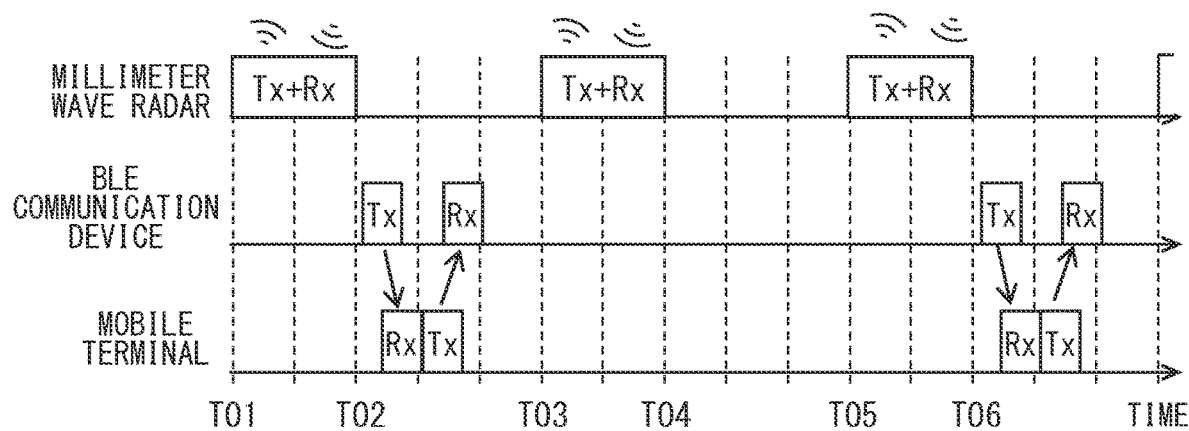
FIG. 8 is a conceptual diagram showing an example of an adjustment result of communication timing by an adjustment unit.

In step S4, the adjustment unit F32 specifies the timing at which the millimeter wave radar 17 does not transmit millimeter waves (that is, a time period corresponding to the pause period) based on the transmission interval of the millimeter wave radar 17 acquired from the radar ECU 16, the past transmission timing (that is, the transmission time), or the like As shown in FIG. 8, the operation of the BLE communication device 12 is controlled so that the BLE communication device 12 and the mobile terminal 3 communicate with each other within the pause period of the millimeter wave radar 17. For example, the adjustment unit F32 causes the BLE communication device 12x to transmit the response request signal immediately after the transmission and reception period of the millimeter wave radar 17 ends (for example, 5 milliseconds). In FIG. 8, Tx indicates a time period for transmitting the probe wave and signal, and Rx indicates a time period for receiving the probe wave and signal. The horizontal axis of FIG. 8 indicates time, and T01 to T02, T03 to T04, and T05 to T06 indicate the transmission and reception period of the millimeter wave radar 17. Step S4 corresponds to the operating mode changing step.

Since the length of the communication packet in the BLE is defined as 80 to 376 bits (=10 to 47 octets), considering that the bit rate is 1 Mbps, the length of one packet temporally falls within the range of 80 to 376 microseconds. That is, one packet is sufficiently smaller than one millisecond. In addition, it is assumed that the pause period of the millimeter wave radar 17 is secured for 10 milliseconds or more (here, 30 milliseconds). Therefore, the bidirectional communication between the mobile terminal 3 and the BLE communication device 12 can fall within the pause period of the millimeter wave radar 17.

Note that FIG. 8 shows a mode in which the communication device on the vehicle side (that is, the BLE communication device 12x) acts as a master in the BLE communication and the mobile terminal 3 acts as a slave. Specifically, a mode is shows in which the BLE communication device 12x transmits the response request signal and the mobile terminal 3 returns the response signal thereto. The response request signal may be any one that requests a specific communication device to return the response signal, and the content (in other words, the signal sequence) thereof can be changed as appropriate. It is preferable that the response request signal and the response signal include information indicating the transmission source and the destination.

When the BLE communication device 12x is the master, the adjustment of the communication timing can be realized by the BLE communication device 12x. The mobile terminal 3 may be the master and the BLE communication device 12x may be the slave. When the mobile terminal 3 is the master, the BLE communication device 12x may transmit predetermined adjustment data to the mobile terminal 3, and the communication timing may be adjusted at the mobile terminal 3 side based on the adjustment data. The adjustment data can be, for example, data indicating the transmission timing, the pause period, or the like of the millimeter wave radar 17. The adjustment data may be data indicating a communicable time period. The adjustment data may include information for synchronizing the mobile terminal 3 and the BLE communication device 12. The radio signal corresponding to the adjustment data corresponds to the timing adjustment signal.

When each BLE communication device 12 receives the signal from the mobile terminal 3, as described with reference to FIG. 6, the reception strength information in each BLE communication device 12 is collected in the smart ECU 11. In step S5, the position estimation unit F6 estimates the position of the mobile terminal 3 based on the reception strength of each BLE communication device 12 and the mounting position of each BLE communication device 12. When step S3 is negatively determined and step S4 is omitted, the BLE communication device 12x can communicate with the mobile terminal 3 at any timing. Step S5 corresponds to the position estimation step.

As described above, whether the communication control unit F3 of the present embodiment adjusts the communication timing differs according to whether the current status is determined to be the simultaneous operation scene. Specifically, the communication timing is not adjusted when the current status is not the simultaneous operation scene, while the communication timing is adjusted when the current status is the simultaneous operation scene. Adjusting the communication timing corresponds to changing the operating mode of the communication device. The adjustment data is transmitted when the mobile terminal 3 is the master and corresponds to specific realizing means for the adjustment of the communication timing. Therefore, transmitting the adjustment data also corresponds to changing of the operating mode of the communication device.

Effect of Above Configuration

In a configuration in which the millimeter wave radar and the BLE communication device 12 are disposed close to each other, the spurious of one transmission wave (the other communication frequency band) becomes noise for the other, and the communication quality deteriorates, or the estimation results of the distance and the direction may cause an error in. In particular, in the technique of estimating the position based on the reception strength, the propagation time of the signal, the arrival direction, or the like, the influence of noise on the estimation accuracy is large.

With respect to such a problem, according to the above configuration, since both the millimeter wave radar 17 and the BLE communication device 12 do not simultaneously operate, the influence of mutual interference can be reduced. For example, the possibility that the BLE communication device 12 receives the signal from the mobile terminal 3 when transmitting and receiving the probe wave of the millimeter wave radar 17 is reduced. As a result, it is possible to reduce the risk that the estimation accuracy of the position of the mobile terminal 3 deteriorates with the spurious component of the probe wave transmitted by the millimeter wave radar 17 as noise for the BLE communication device 12. Even when the radar vicinity device is configured to transmit the signal to the mobile terminal 3, the possibility that the radar vicinity device transmits the signal is reduced when transmitting and receiving the probe wave of the millimeter wave radar 17. As a result, the spurious component of the radio signal transmitted by the BLE communication device 12 as the radar vicinity device acts as noise for the millimeter wave radar 17, and the risk that the object detection and recognition accuracy deteriorates can be reduced.

Figure 9:
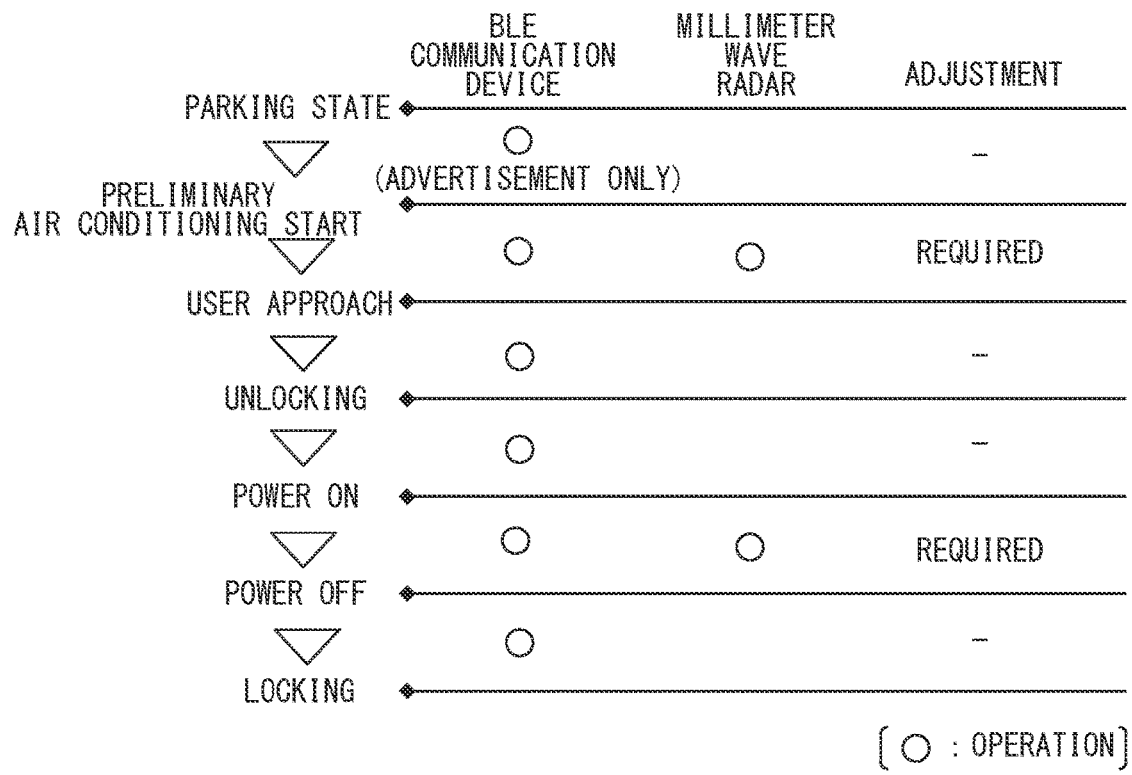
FIG. 9 is a diagram for explaining a scene in which the adjustment unit operates.

According to the above configuration, as shown in FIG. 9, the communication timing between the BLE communication device 12 and the mobile terminal 3 can be adjusted not only while the user is on board but also when the millimeter wave radar 17 is in operation due to the preliminary air conditioning operation. Specifically, the communication timing is adjusted even when the approach of the user is detected during the preliminary air conditioning operation. As described above, by including the preliminary air conditioning operation as one of the scenes where the millimeter wave radar 17 and the BLE communication device 12 interfere with each other, the risk that the position estimation accuracy deteriorates when the user approaches can be reduced. In addition, by including the automatic parking and exiting time in the scene where the millimeter wave radar 17 and the BLE communication device 12 may interfere with each other, the risk that the position estimation accuracy of the user when the user remotely controls the vehicle in the vicinity of the vehicle deteriorates can be reduced.

The configuration in which the BLE communication device 12 and the millimeter wave radar 17 are disposed close to each other and the mutual interference between the BLE communication device 12 and the millimeter wave radar 17 have not been studied in the present technical field for estimating the position of the user. The configuration of the present disclosure is created with a focus on the possibility that the BLE communication device and the millimeter wave radar may be disposed close to each other in the future.

While the embodiments of the present disclosure have been described above, the present disclosure is not limited to the embodiments described above, and various modifications to be described below are included in the technical scope of the present disclosure, and may be implemented by various modifications within a scope not departing from the spirit in addition to the modifications to be described below. For example, various modifications to be described below can be executed in combination as appropriate within a scope that does not cause technical inconsistency. The members having the same functions as those described in the embodiment described above are denoted by the same reference numerals, and the description of the same members will be omitted. When referring to only a part of the configuration, the configuration of the embodiment described above can be applied to other portions.

<Supplement to Timing Adjustment Method>

Figure 10:
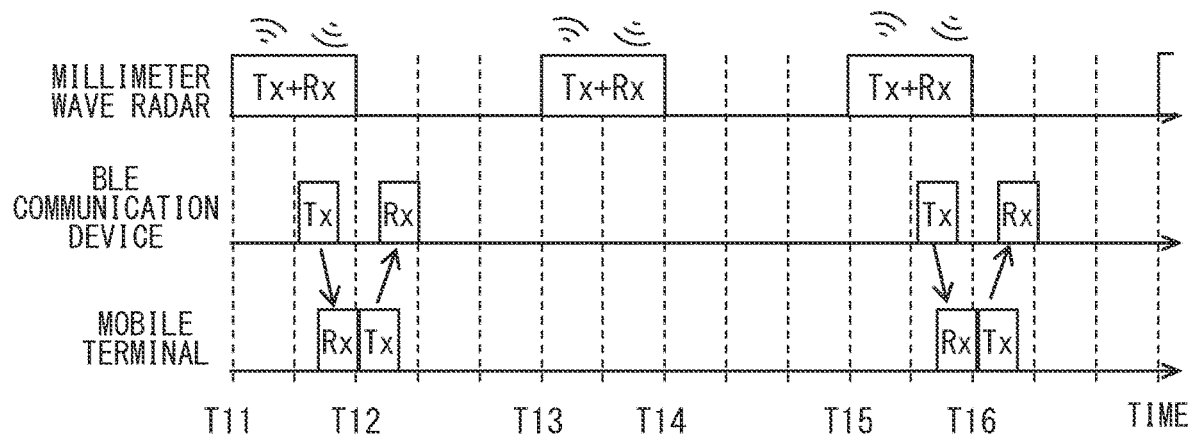
FIG. 10 is a conceptual diagram showing an example of an adjustment result of communication timing by the adjustment unit.

Although FIG. 7 shows a mode in which control is performed so as not to completely overlap, the communication timing adjustment method is not limited to the above mode. For example, as shown in FIG. 10, the transmission timing of the response request signal may overlap with the transmission and reception period of the millimeter wave radar 17. Even with such a configuration, it is possible to reduce the risk that the estimation accuracy of the terminal position deteriorates. The horizontal axis of FIG. 10 indicates time, and T11 to T12, T13 to T14, and T15 to T16 indicate the transmission and reception period of the millimeter wave radar 17. Although FIG. 10 discloses a mode in which the in-vehicle BLE communication device 12 acts as the master, the mobile terminal 3 may be the master.

Figure 11:
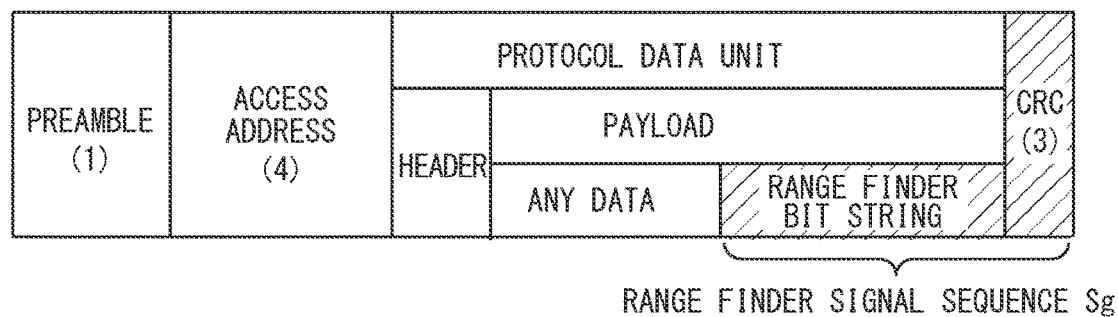
FIG. 11 is a diagram showing a configuration of a communication packet received by the BLE communication device.
Figure 12:
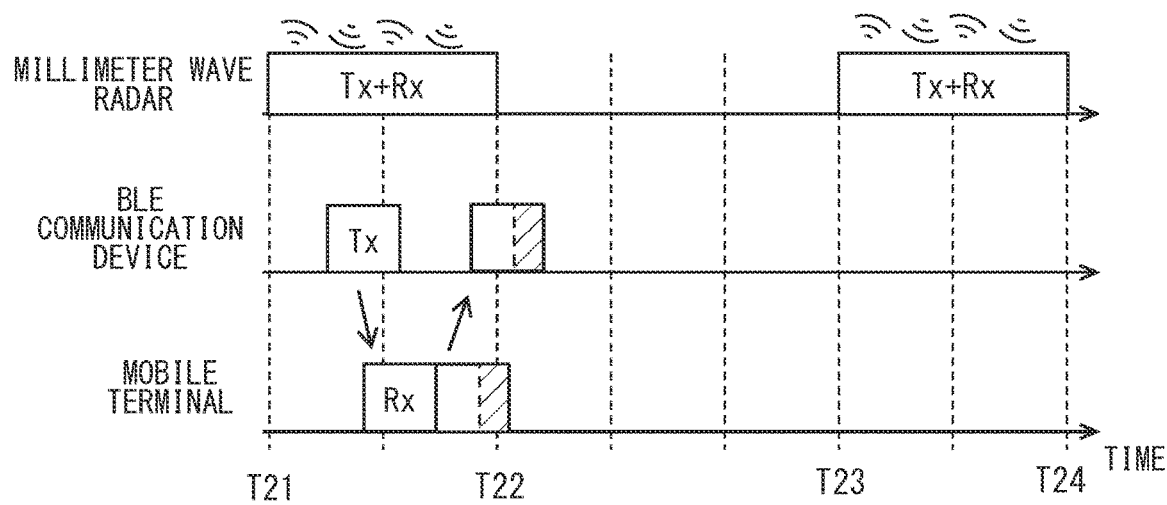
FIG. 12 is a conceptual diagram showing an example of an adjustment result of communication timing by the adjustment unit.

As shown in FIG. 11, when the response signal includes the range finder signal sequence Sg at the end of the data signal sequence, as shown in FIG. 12, the communication timing with the mobile terminal 3 may be adjusted so that the range finder signal sequence Sg does not overlap (or is not aligned) with the transmission and reception period of the millimeter wave radar 17. In FIGS. 11 and 12, diagonal shaded hatched portions conceptually indicate the range finder signal sequence Sg. The range finder signal sequence Sg refers to a portion used for determining the reception strength, the arrival direction, and the like. The numbers in parentheses in FIG. 11 indicate the length of the bit string in octets. For example, the preamble shows that it has a length of 1 octet.

Figure 13:
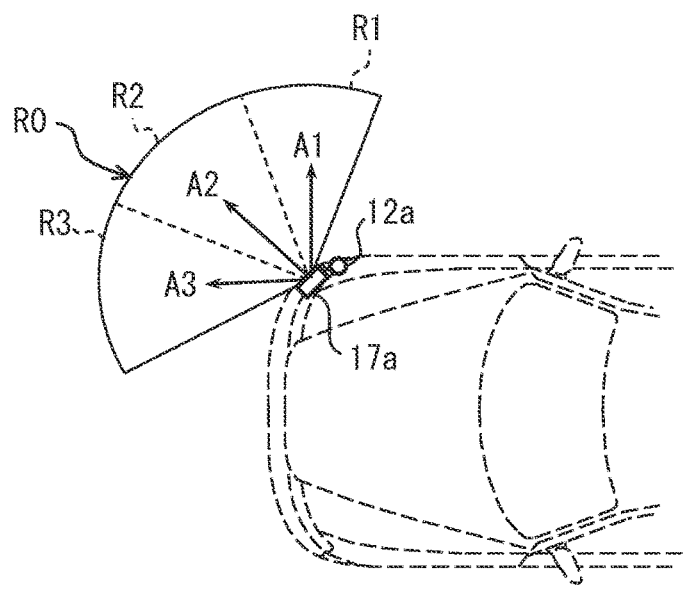
FIG. 13 is a view showing an example of an operating mode of the millimeter wave radar.

As a configuration of the millimeter wave radar 17, it is conceivable that the transmission direction (in other words, directivity) of the probe wave is swung in the horizontal direction to provide a wide detection range as a whole. As shown in FIG. 13, the millimeter wave radar 17*a* may be configured to transmit and receive the probe waves by switching the main beam of the transmission antenna in the order of the first direction A1, the second direction A2, and the third direction A3. The first direction A1 corresponds to a direction in which an object existing in the first range R1, which is a part of the overall detection range R0, can be detected. The first direction A1 corresponds to a direction in which an object existing in the second range R2, which is a part of the detection range R0, can be detected. The third direction A3 corresponds to a direction in which an object existing in the third range R3, which is a part of the detection range R0, can be detected.

In the example shown in FIG. 13, the state where the first range R1 is the detection range is a state where the directivity of the millimeter wave radar 17*a* is most oriented in the direction in which the BLE communication device 12*a*, which is the radar vicinity device, is present. In other words, it corresponds to a pattern in which the millimeter wave radar 17*a* and the BLE communication device 12*a* are most likely to interfere with each other among multiple directivity patterns that can be switched by the millimeter wave radar 17. The state where the second range R2 and the third range R3 are the detection range is a state where the directivity of the millimeter wave radar 17*a* is relatively oriented in the direction in which the BLE communication device 12*a* is not present. In other words, it corresponds to a pattern in which the millimeter wave radar 17a and the BLE communication device 12a are relatively unlikely to interfere with each other among the multiple directivity patterns that can be switched by the millimeter wave radar 17. In particular, the third direction A3 corresponds to a direction farthest from the direction in which the BLE communication device 12a is present (largest angular difference).

Figure 14:
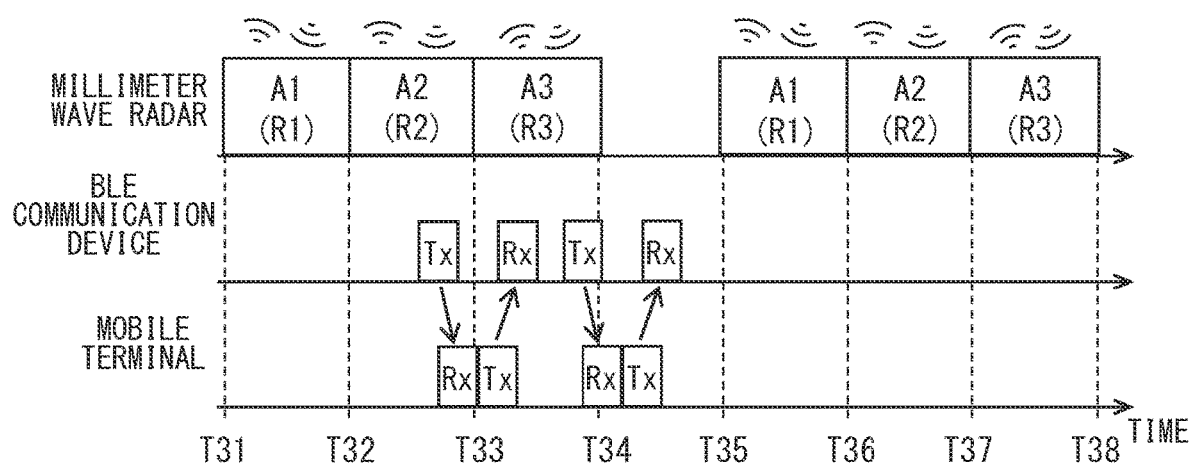
FIG. 14 is a conceptual diagram showing an example of an adjustment result of communication timing by the adjustment unit.

In such a configuration, as shown in FIG. 14, the adjustment unit F32 may adjust the communication timing so as to communicate with the mobile terminal 3 during a period in which the directivity is oriented in a direction other than the first direction A1 in addition to the pause period. The above effects are also obtained by such a configuration. Since the time period during which communication with the mobile terminal 3 is possible relatively increases, the position estimation process is executable with high frequency.

The horizontal axis of FIG. 14 indicates time, and the periods from time T31 to T32 and from time T35 to T36 indicate the period during which the probe wave is transmitted in the first direction A1. The period from time T32 to T33 and the period from time T36 to T37 indicate the period during which the probe wave is transmitted in the second direction A2. The periods from time T33 to T34 and from time T37 to T38 indicate the period during which the probe wave is transmitted in the third direction A3. The period from time T34 to T35 indicates the pause period. The transmission direction can be switched, for example, every 10 milliseconds. The pause period can also be set to 10 milliseconds or the like. Although the millimeter wave radar 17a has been described above, other millimeter wave radars 17 can be configured in the same manner.

The smart ECU 11 may not necessarily adjust the communication timing. For example, the position estimation unit F6 may be configured to perform the estimation of the terminal position using only the observation data acquired during the pause period without using the observation data of each BLE communication device 12 during the period when the millimeter wave radar 17 transmits the probe wave. Specifically, the position estimation unit F6 may be configured to discard the observation data of each BLE communication device 12 during the period when the millimeter wave radar 17 transmits the probe wave. The change in the operating mode of the position estimation unit F6 may be performed as an internal process of the position estimation unit F6. The observation data here refers to data for estimating the terminal position (in other words, position estimation data) such as the reception strength, the flight time, and the arrival direction. According to such a configuration, the terminal position is estimated without using the reception strength, the ToF, or the like influenced by the spurious component from the millimeter wave radar 17. As a result, it is possible to restrict an error in the terminal position. Such a configuration also corresponds to a configuration in which the operating mode of the position estimation unit F6 is changed in response to the determination that the current status is the simultaneous operation scene.

<Supplement of Position Estimation Method of Mobile Terminal 3>

Figure 15:
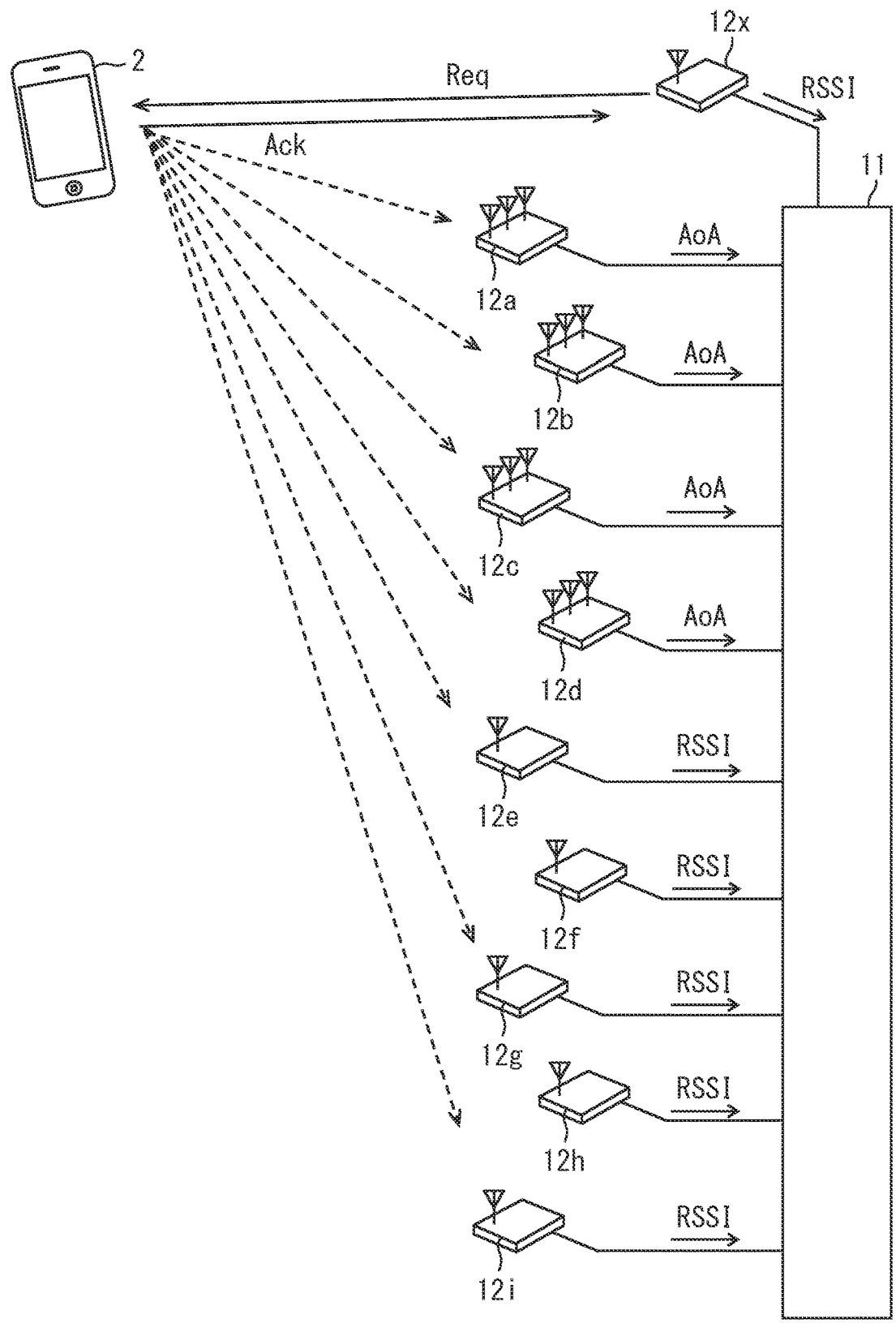
FIG. 15 is a diagram for explaining an estimation method of a position of a mobile terminal.

The position estimation unit F6 may estimate the terminal position by combining multiple position estimation methods. For example, as shown in FIG. 15, the smart ECU 11 may estimate the terminal position by combining the RSSI method and the AoA method. For example, the BLE communication devices 12a to 12d provided at the corner portions of the vehicle may be configured to calculate the arrival angle (in other words, the arrival direction) of the signal from the mobile terminal 3, while the other BLE communication devices 12e to 12h and 12x may be configured to calculate the reception strength. In that case, the position estimation unit F6 can combine the arrival direction observed by at least one of the BLE communication devices 12a to 12d and the reception strength observed by at least one of the BLE communication devices 12e to 12h and 12x to estimate the terminal position. The BLE communication device 12 that estimates the arrival direction may be configured to include an array antenna. The BLE communication device 12 including the array antenna may be configured to calculate the arrival direction by analyzing the reception results of the multiple antennas 122 and report the arrival direction to the smart ECU 11. In such a configuration, the BLE communication device 12 other than the gateway communication device may include at least a receiving function. Each BLE communication device 12 may provide reception result data indicating the reception strength, the phase, or the like for each antenna to the smart ECU 11, and the smart ECU 11 may calculate the arrival direction in each BLE communication device 12.

Figure 16:
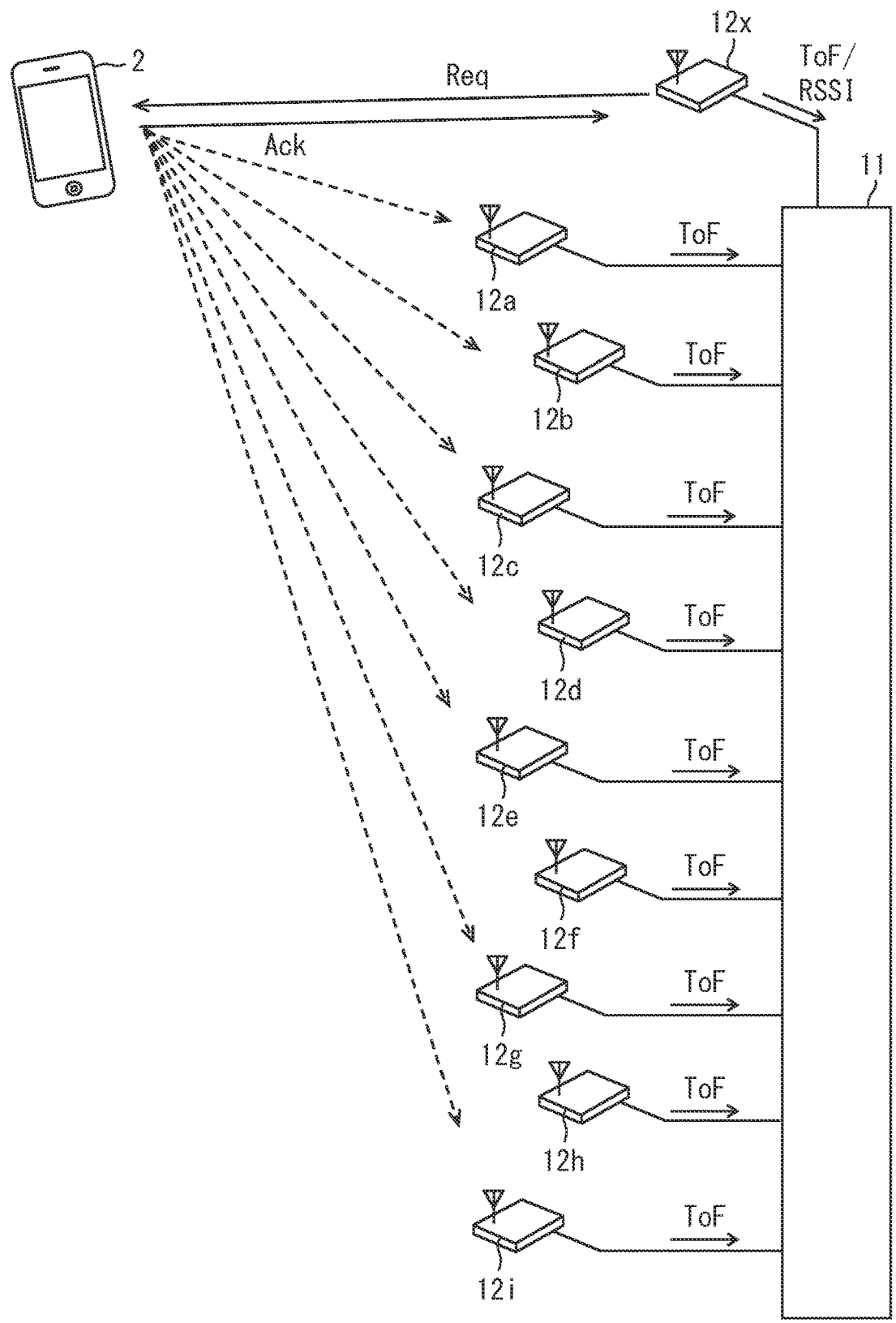
FIG. 16 is a diagram for explaining an estimation method of the position of the mobile terminal.

As shown in FIG. 16, the smart ECU 11 may estimate the terminal position by the ToF method. The communication microcomputer 125 of each BLE communication device 12 may be configured to calculate the flight time (that is, the ToF) from the transmission of the signal by the mobile terminal 3 to the reception of the signal by the BLE communication device 12 and provide the flight time to the smart ECU 11. The communication microcomputer 125 of the BLE communication device 12 can detect the phase of the received signal and calculate the flight time (that is, the ToF) corresponding to the distance from the mobile terminal 3 from the phase difference when the frequency is changed. When the flight time and the phase difference are calculated, the reception result of the signal from the BLE communication device 12 as the gateway communication device may be used. Each BLE communication device 12 may be configured to specify both the flight time and the reception strength and report the both to the smart ECU 11. The flight time may be calculated by the smart ECU 11 based on the reception result of each BLE communication device 12.

The smart ECU 11 may calculate the ToF using the round trip time. In that case, the BLE communication device 12x as the gateway communication device measures the round trip time from the transmission of the response request signal to the reception of the response signal from the mobile terminal 3 and reports the round trip time to the smart ECU 11. The hearing device, which is the BLE communication device 12 other than the gateway communication device, measures the reception interval from the reception of the response request signal issued by the gateway communication device to the reception of the response signal issued by the mobile terminal 3 and reports the reception interval to the smart ECU 11. The smart ECU 11 specifies the first propagation time, which is the signal propagation time between the mobile terminal and the gateway communication device, based on the round trip time. The smart ECU 11 specifies the second propagation time, which is the propagation time of the signal between the mobile terminal and the hearing device, based on the reception interval and the first propagation time in each hearing device. The first propagation time and the second propagation time correspond to the ToF, respectively. As a calculation method of the ToF using the round trip time, the method described in Patent Literature 2 can be used.

Each of the multiple BLE communication devices 12 may be configured to individually transmit and receive radio signals to and from the mobile terminal 3 to calculate at least one of the reception strength, the arrival direction, and flight time. In the mode in which each BLE communication device 12 individually communicates with the mobile terminal 3, the above communication timing adjustment may be performed only when the radar vicinity device communicates with the mobile terminal 3. In the mode in which each BLE communication device 12 individually communicates with the mobile terminal 3, the communication timing adjustment may be performed for each radar vicinity device.

<About Communication System Capable of Being Used for Position Estimation of Mobile Terminal 3>

In the above embodiment, the configuration is shown, in which the radio wave used for wireless communication for establishing the communication connection between the in-vehicle system 1 and the mobile terminal 3 and the radio wave used for specifying the terminal position are radio waves used in the same communication technique, but the present disclosure is not necessarily limited to the embodiment. For example, the radio wave used for wireless communication for establishing the communication connection between the in-vehicle system 1 and the mobile terminal 3, and the radio wave used for specifying the terminal position may be radio waves used in a different communication technique.

For example, wireless communication performed by establishing the communication connection between the in-vehicle system 1 and the mobile terminal 3 may be communication compliant with the BLE, while communication (hereinafter referred to as UWB communication) of an Ultra Wide Band-Impulse Radio (UWB-IR) method may be used to specify the terminal position. Hereinafter, a system configuration using UWB communication for terminal position estimation will be referred to as a UWB combined configuration.

Figure 17:
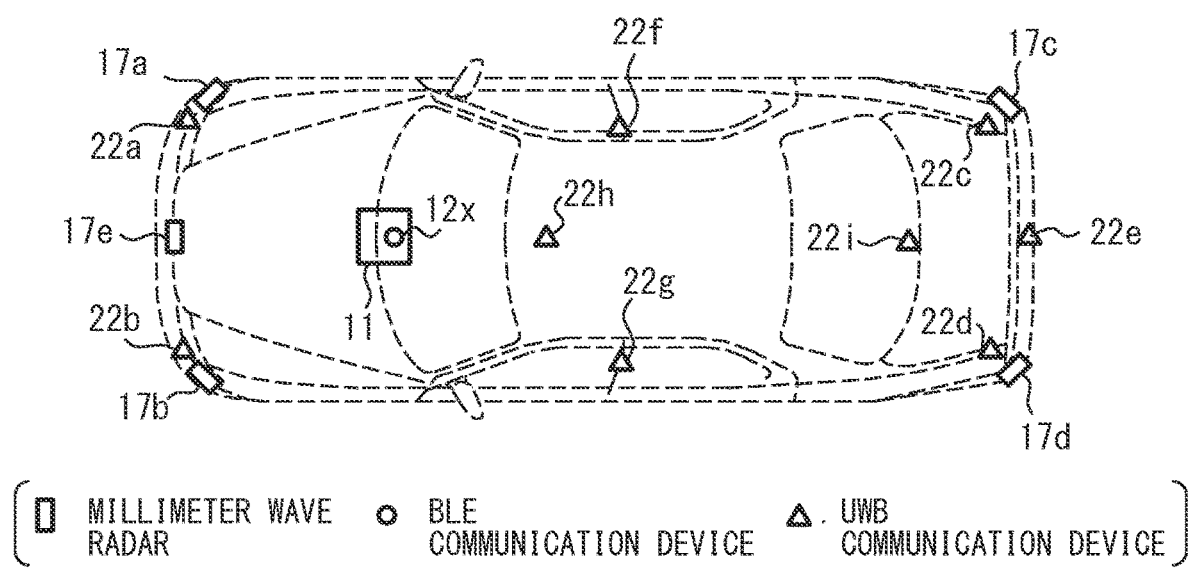
FIG. 17 is a view showing a system configuration example of a method in which a UWB communication device is used in combination.

In the UWB combined configuration, the mobile terminal 3 includes a circuit module for transmitting and receiving impulse-shaped radio waves (hereinafter, impulse signals) used in UWB communication. As shown in FIG. 17, the in-vehicle system 1 includes a communication module (hereinafter, UWB communication device) for receiving an impulse signal used in UWB communication. The impulse signal used in UWB communication is a signal having a pulse width of, for example, 2 nanoseconds, which is extremely short. UWB communication is sometimes called ultra-wideband communication. The frequency bands that can be used for UWB communication are, for example, 3.1 GHz to 10.6 GHZ, 3.4 GHz to 4.8 GHz, 7.25 GHz to 10.6 GHZ, 22 GHZ to 29 GHZ, and the like.

The communication control unit F3 having the UWB combined configuration acquires data from the mobile terminal 3 received by the UWB communication device. The communication control unit F3 generates data addressed to the mobile terminal 3 and outputs the data to the UWB communication device 22. Accordingly, a pulse sequence signal corresponding to desired data is wirelessly transmitted. The pulse sequence signal here means a signal sequence in which multiple impulse signals are disposed at predetermined time intervals, which is generated by modulating transmission data by an on-off modulation system. The communication control unit F3 causes any UWB communication device 22 to transmit the impulse signal based on an instruction from the position estimation unit F6. The UWB communication device 22 for transmitting the impulse signal is selected by the position estimation unit F6.

The position estimation unit F6 estimates the distance from each UWB communication device 22 to the mobile terminal 3 by exchanging impulse signals between the mobile terminal 3 and each of the multiple UWB communication devices 22 in a predetermined order. The ToF method or the like can be employed for estimating the distance. The position of the mobile terminal 3 is estimated based on the distance information from each UWB communication device 22 to the mobile terminal 3 and the mounting position data of each UWB communication device 22. As described above, even if the UWB communication device 22 is used instead of the BLE communication device 12, the terminal position can be estimated. That is, the BLE communication device 12 in the present specification can be performed by being replaced with the UWB communication device 22.

<Supplement of Estimation Interval>

The interval for estimating the position of the mobile terminal 3 (that is, the estimation interval) may be dynamically changed depending on the status. The estimation interval at the time of traveling in a state where the user is present in the vehicle cabin may be larger (in other words, sparse) than the estimation interval when the vehicle is stopped. According to this configuration, the execution frequency of the terminal position estimation process while the vehicle is traveling becomes sparse, and the risk of interference between the millimeter wave radar 17 and the BLE communication device 12 can be further reduced.

The estimation interval during automatic parking and exiting control may be shorter than the estimation interval in a state where the user is on board. Laws, regulations, and the like define that automatic parking and automatic exiting can be used as a condition by being provided that the user is present within a control permission region within a predetermined distance from the vehicle Hv. According to this configuration, it is possible to promptly detect that the user has left the control permission region and take measures such as stopping the vehicle.

The estimation interval in the scene where the user approaches the vehicle Hv in the parking state may be denser than the estimation interval when the user already boards the vehicle. According to such a configuration, the approach of the user can be promptly detected, and an approach trajectory of the user can be accurately generated. As a result, it is possible to provide a service according to the approach mode of the user. The service here includes preparation for opening and closing the trunk door, automatic adjustment of the seat position according to the expected seating position of the user, lighting of the welcome illumination, and the like.

<Supplement of Determination Particle Size of Terminal Position>

In the above, the position estimation unit F6 discloses a mode of estimating the relative position coordinates with respect to the vehicle Hv, but the present disclosure is not limited to the above mode. The position estimation unit F6 may determine whether the mobile terminal 3 is present in the vehicle cabin. The position estimation unit F6 may be configured to determine the position of the mobile terminal 3 in three stages of the inside of the vehicle cabin, within the control permission region outside the vehicle cabin, and farther than the control permission region. That is, the particle size (in other words, fineness) of the position estimation may be two steps, three steps, or the like.

The control permission region here refers to a region outside the vehicle cabin, which permits the execution of automatic vehicle control according to the position of the user. For example, the control permission region can be within 1 m from the vehicle Hv. The control permission region can be within 6 m from the vehicle Hv. The control permission region may be changed according to the control content. For example, the control permission region for locking and unlocking may be set to a vehicle vicinity region such as within 1 m from the vehicle Hv, while the control permission region for automatic parking and exiting of the vehicle may be set to a quasi-vicinity region such as within 6 m from the vehicle Hv. The quasi-vicinity region refers to a wider range than the vicinity region. The vicinity region and the quasi-vicinity region may be subdivided into the right side, the left side, the rear side, the front side, and the like of the vehicle Hv. As the determination method of whether the mobile terminal 3 is present in the vehicle cabin, the methods described in Patent Literatures 3 to 6 can be used.

In relation to the above, the position estimation unit F6 may switch the particle size of the terminal position estimation according to the scene. For example, when the vehicle Hv is in the parking state or is automatically parked and unloaded, while the relative position coordinates of the mobile terminal 3 may be estimated and it may be configured to determine only whether the mobile terminal 3 is present in the vehicle cabin from when the mobile terminal 3 is once determined to be present in the vehicle cabin until when the door is opened. During normal traveling, it may be configured to determine the terminal position based on the particle size of whether the mobile terminal 3 is present in the vehicle cabin.

The position estimation unit F6 may change the combination of the BLE communication devices 12 used for estimating the terminal position according to the particle size of the terminal position determination. For example, when estimating the position coordinates of the mobile terminal 3 outside the vehicle cabin, all BLE communication devices 12 are used, while whether the mobile terminal 3 is present in the vehicle cabin may be determined without using the radar vicinity device. For example, the position estimation unit F6 may perform confirming determination that the mobile terminal 3 is present in the vehicle cabin based on the reception strength of the BLE communication devices 12e to 12i from when the mobile terminal 3 is once determined to be present in the vehicle cabin until when the door is opened.

After once the user is determined to be present in the vehicle cabin, there is a high possibility that the millimeter wave radar 17 is in operation as the vehicle Hv travels. The adjustment of the communication timing with the mobile terminal 3 may be performed even only when the radar vicinity device performs at least one of transmission and reception. The adjustment process can be omitted when the radar vicinity device is not operated. In view of such circumstances, according to the configuration in which whether the user is present in the vehicle cabin is determined without using the radar vicinity device, the frequency of performing the adjustment process for restricting interference with the millimeter wave radar 17 can be restricted. That is, the load on the processor 111 and the communication microcomputer 125 can be reduced.

<Supplement of Interference Restriction Method>

Figure 18:
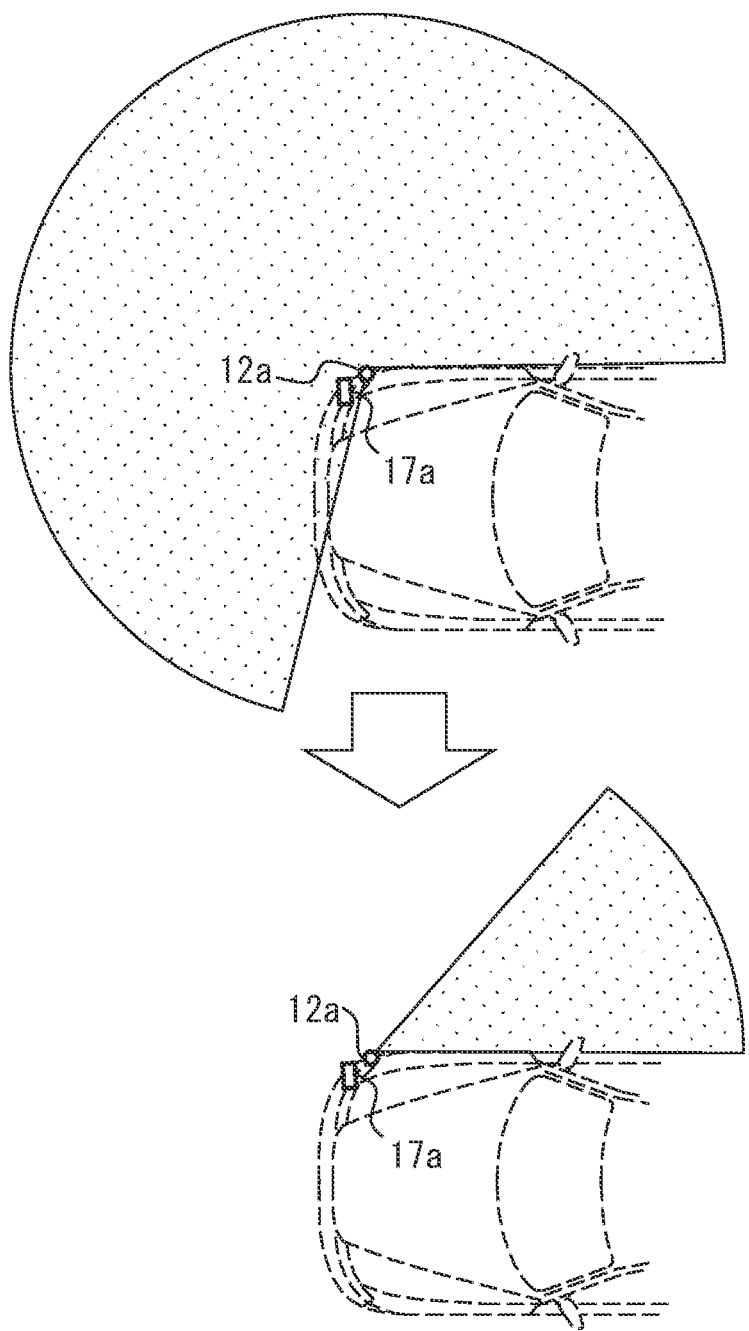
FIG. 18 is a conceptual view for explaining a mode of restricting interference by changing a directivity of the BLE communication device.

In the above, the mode of restricting the degree of interference by changing the communication timing has been disclosed, but the present disclosure is not limited to the above mode. When the BLE communication device 12 as the radar vicinity device has a variable directivity, the communication control unit F3 may restrict interference with the millimeter wave radar 17 by changing the directivity of the radar vicinity device. For example, as shown in FIG. 18, when the current status is determined to be the radar operation scene, the directivity of the BLE communication device 12 which is the radar vicinity device may be narrowed as compared with a case where the radar operation scene is not determined. More specifically, when the current status is not determined to be the radar operation scene, the directivity is set to the maximum angle range that can be set, while when the current status is determined to be the radar operation scene, the communication range is limited to the vicinity of the door. Even with such a configuration, the degree of interference can be restricted. The change of the directivity of the antenna 122 may be realized by software or mechanically realized by using an actuator such as a motor. Changing the directivity of the radar vicinity device also corresponds to an example of changing the operating mode of the communication device.

The communication control unit F3 may change the combination of the BLE communication devices 12 used for estimating the terminal position according to whether the current status is determined to be the simultaneous operation scene. In other words, the communication control unit F3 may change the combination of the BLE communication devices 12 to be operated according to whether the current status is determined to be the simultaneous operation scene. For example, when the current status is determined not to be the simultaneous operation scene, the terminal position may be estimated by using all BLE communication devices 12, while when the current status is determined to be the simultaneous operation scene, the terminal position may be estimated without using a part or all of the radar vicinity devices. Such a control content also corresponds to changing the operating mode of the communication device according to whether the current status is the simultaneous operation scene.

The radar vicinity device may be mounted in the vicinity of the millimeter wave radar 17 and in a place where the directivity of the millimeter wave radar 17 is not suitable, for example, on the back surface side of the millimeter wave radar 17. Mutual interference can also be restricted by such a configuration.

<Supplement of Operating Mode of Millimeter Wave Radar>

Figure 19:
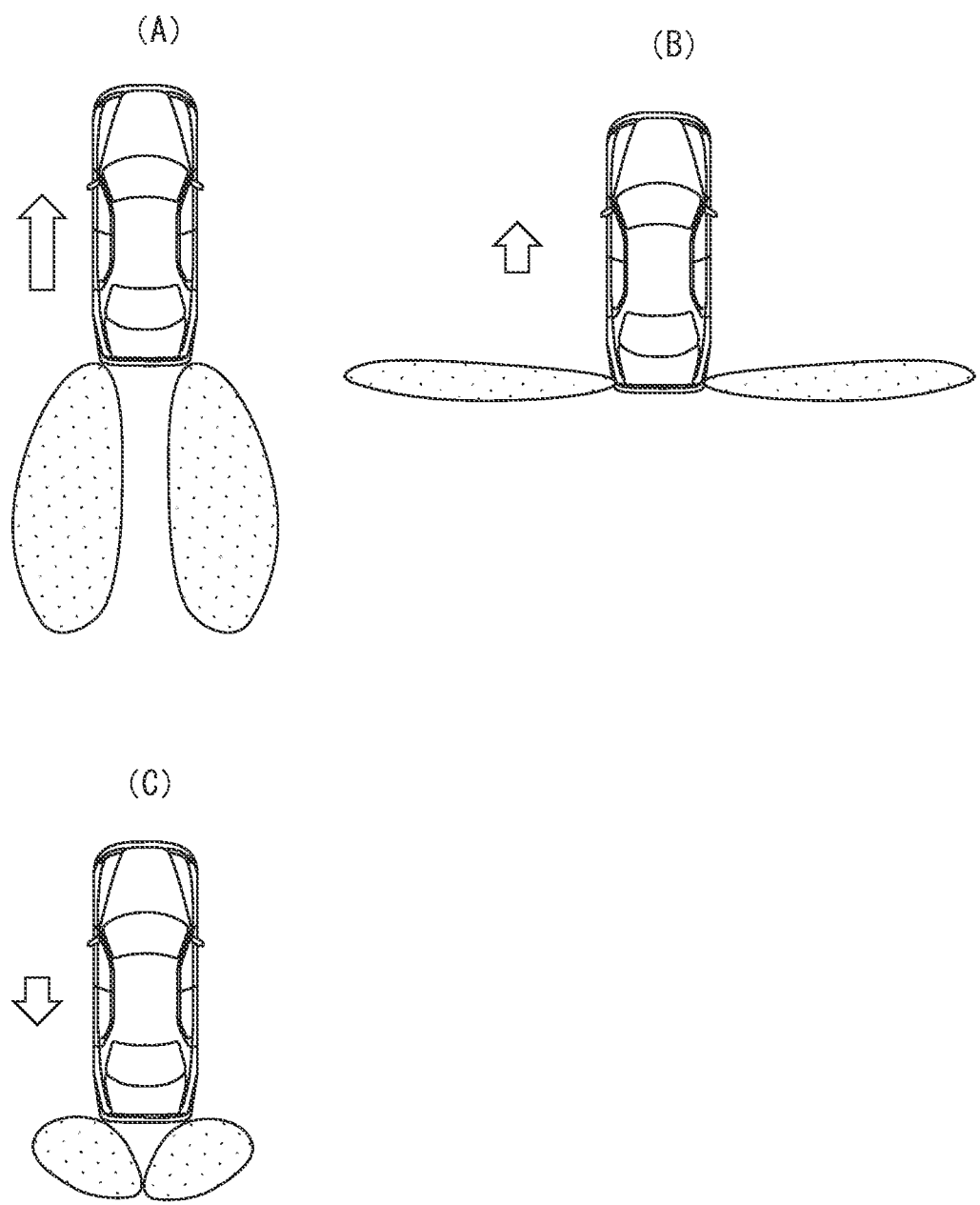
FIG. 19 is a view showing an example of multiple operation modes that may be included in the millimeter wave radar.

The radar ECU 16 may operate the millimeter wave radar 17 in a mode in which the transmission interval of the probe wave is sparser during the vehicle is stopped than that during traveling. During traveling at low speed, the transmission interval of the millimeter wave radar 17 may be sparser than that during normal traveling. The millimeter wave radar 17 and the radar ECU 16 may be configured to have variable transmission interval and transmission and reception period length of the probe wave. Each millimeter wave radar 17 may be configured such that the detection range can be changed according to the traveling scene and the application during the execution. For example, as shown in FIG. 19, the detection range may be changed between the time of normal traveling (A in the drawing), the time of low speed traveling (B in the drawing), and the time of backward traveling (C in the drawing). It may have a detection range for exiting. The arrow in FIG. 19 indicates the traveling direction, and the length of the arrow conceptually indicates the magnitude of the travel speed. The detection range of the millimeter wave radar 17 is determined by the transmission direction of the probe wave, the transmission power, the reception sensitivity for each direction, or the like. For example, the change of the detection range can be realized by changing the directivity of the array antenna constituting the millimeter wave radar 17 by software or mechanically by using a motor or the like. When multiple array antennas are provided, the change of the detection range may be realized by selectively switching the combination of the array antennas to be used. FIG. 19 exemplifies the switching mode of the detection range of the millimeter wave radar 17 provided in the rear corner of the vehicle Hv, but the millimeter wave radar 17 provided in other portions such as the front corner may also be configured to switch multiple operation modes in which the patterns of the directivity are different from each other.

In the above, a mode is disclosed in which the smart ECU 11 restricts the interference between the millimeter wave radar 17 and the BLE communication device 12 by changing the communication timing or the like between the BLE communication device 12 and the mobile terminal 3, but the present disclosure is not limited to the above mode. The radar ECU 16 may restrict interference by changing the operation of the millimeter wave radar 17 according to whether the current status is determined to be the simultaneous operation scene. The radar ECU 16 may include an operating mode changing unit.

For example, when the current status is determined to be the simultaneous operation scene, the radar ECU 16 may increase the transmission interval of the probe wave as compared with when the current status is determined not to be the simultaneous operation scene. When the current status is determined to be the simultaneous operation scene, the transmission and reception period may be shorter than that when the current status is determined not to be the simultaneous operation scene. According to such a configuration, the time period in which the millimeter wave radar 17 operates in the simultaneous operation scene is reduced, so that a risk that the probe wave of the millimeter wave radar 17 becomes an error factor in the distance and direction estimations in the BLE communication device 12 can be reduced. The status in which the simultaneous operation scene occurs is basically that the vehicle Hv is stopped or traveling at low speed. In such a scene, the amount of movement of the vehicle Hv per unit time is small, so even if the transmission interval of the millimeter wave radar 17 is lengthened or the transmission and reception period is shortened, the degree of influence on vehicle control based on object recognition can be expected to fall within an allowable range.

When the current status is determined to be the simultaneous operation scene, the radar ECU 16 may reduce the detection range of the millimeter wave radar 17 disposed close to the BLE communication device 12 to an angle range narrower than when the current status is determined to be the simultaneous operation scene. When the current status is determined to be the simultaneous operation scene, the radar ECU 16 may also cause the center of the directivity of the millimeter wave radar 17 disposed close to the BLE communication device 12 to be directed in a direction in which the BLE communication device 12 is not present compared with a case where the current status is determined not to be the simultaneous operation scene. Even with such a configuration, it is possible to restrict the interference between the millimeter wave radar 17 and the BLE communication device 12.

Figure 20:
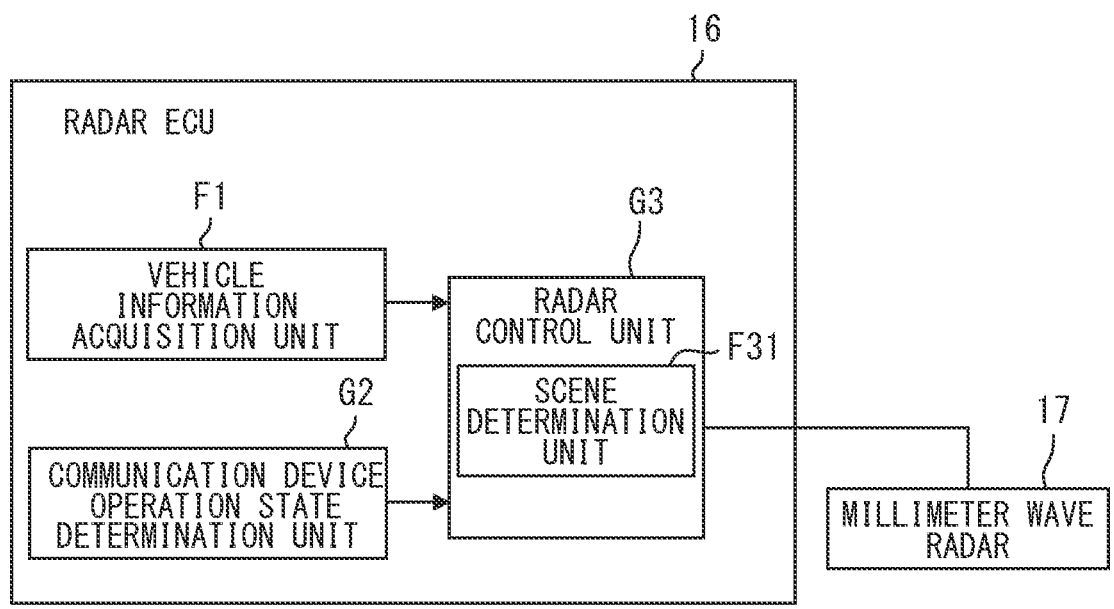
FIG. 20 is a diagram showing a functional configuration example when a radar ECU has a function of restricting interference.

The microcomputer 161 may determine whether the current status is the simultaneous operation scene. In other words, the scene determination unit F31 may be included in the microcomputer 161. The transmission interval of the millimeter wave radar 17, the length of the transmission and reception period, and the change of the directivity may be performed by the microcomputer 161 included in the radar ECU 16. FIG. 20 shows an example of the functional configuration of the radar ECU 16 based on the above technical concept. As shown in FIG. 20, the radar ECU 16 may include a vehicle information acquisition unit F1, a communication device operation state determination unit G2, a radar control unit G3, and a scene determination unit F31 as functional blocks. The communication device operation state determination unit G2 is configured to acquire communication device operation information indicating the operation state of the radar vicinity device from the radar vicinity device or the smart ECU 11, and determine whether the radar vicinity device is in operation. The radar control unit G3 is configured to adjust the transmission interval of the millimeter wave radar 17, the length of the transmission and reception period, and the directivity based on the determination result of the scene determination unit F31. The microcomputer 161 as the radar control unit G3 also corresponds to an example of the operating mode changing unit.

<About Configuration of Communication Device>

Figure 21:
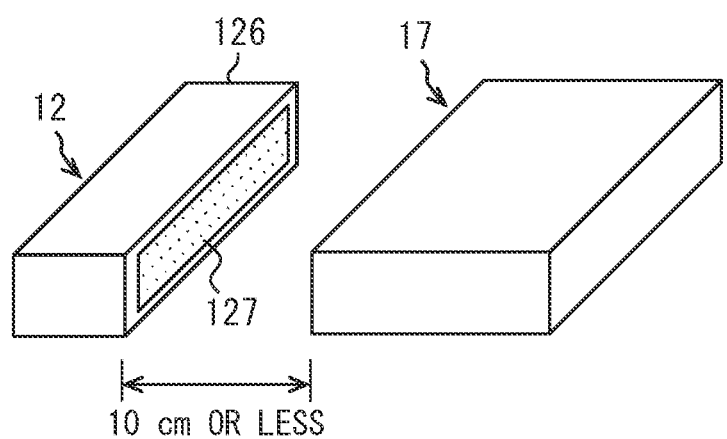
FIG. 21 is a diagram showing an example of the BLE communication device including a shield portion.

In the housing 126 of the BLE communication device 12, as shown in FIG. 21, a shield portion 127 that reflects or absorbs electromagnetic waves may be provided on the side surface portion where the millimeter wave radar 17 is expected to be mounted. In FIG. 21, a portion where the dot pattern is hatched conceptually indicates the shield portion 127. As the shield portion 127, a commercially available electromagnetic wave absorbing sheet or electromagnetic wave preventing sheet can be used. The shield portion 127 is formed by mixing, for example, powders and particles of a soft magnetic material such as iron, nickel, copper, or ferrite with a synthetic resin such as a silicone resin, and processing the material into a sheet shape. The shield portion 127 may be a sheet having a honeycomb mesh structure in which nylon fibers are coated with a metal such as silver, nickel, or copper. The shield portion 127 may have a meta-surface structure. The meta-surface structure is a structure in which artificial structures called unit cells are repeatedly disposed. As the unit cell, for example, various structures such as a mushroom type Electromagnetic Band Gap (EBG) structure can be employed. The shield portion 127 may be realized by using a structure or material capable of attenuating the propagation of electromagnetic waves by a predetermined level or more. The shield portion 127 may have a plate shape (in other words, a panel shape) or a sheet shape. The shield portion 127 of the sheet shape may be attached to a predetermined position of the housing with an adhesive or a pressure sensitive adhesive. The shield portion 127 may be provided by a paint mixed with a magnetic material. The shield portion 127 may be provided on the outer surface of the housing 126, or may be provided inside the housing 126.

The BLE communication device 12 as the radar vicinity device may be provided inside the millimeter wave radar 17. That is, the BLE communication device 12 as the radar vicinity device may be integrally configured with the millimeter wave radar 17. For example, the short-range communication antenna 122 may be provided on the surface of the substrate on which the array antenna for transmitting and receiving the probe wave is provided in the millimeter wave radar 17. The communication microcomputer 125 and the like may be disposed on the back surface of the substrate surface on which the antenna 122 is provided. According to the configuration in which the BLE communication device 12 is built in the millimeter wave radar 17, the number of assembled parts in the vehicle manufacturing process can be restricted. As a result, the manufacturing cost can be restricted. The BLE communication device 12 having the above configuration corresponds to a vehicle communication device.

Appendix (1)

The control unit and the method thereof described in the present disclosure may be realized by a dedicated computer constituting a processor programmed to execute one or multiple functions embodied by a computer program. The device and the method thereof described in the present disclosure may be realized by a dedicated hardware logic circuit. The device and the method thereof described in the present disclosure may be realized by one or more dedicated computers configured by a combination of a processor that executes a computer program and one or more hardware logic circuits. The computer program may be stored in a computer-readable non-transitional tangible recording medium as an instruction executed by a computer. The means and/or functions provided by the smart ECU 11 and the radar ECU 16 can be provided by software recorded in a substantive memory device, a computer that executes the software, software only, hardware only, or a combination thereof. Some or all of the functions included in the smart ECU 11 and the radar ECU 16 may be realized as hardware. A mode in which a certain function is realized as hardware includes a mode in which the function is realized by use of one or more ICs or the like. Each ECU may be realized by using MPU or GPU. Each ECU may be realized by combining multiple types of calculation processing devices such as a CPU, an MPU, and a GPU. The ECU may be realized by using a field-programmable gate array (FPGA) or an application specific integrated circuit (ASIC).

The program for operating the computer as the smart ECU 11 or the radar ECU 16 may be stored in a non-transitory tangible storage medium. Various storage media, such as a hard-disk drive (HDD), a solid state drive (SSD), an erasable programmable rom (EPROM), a flash memory, a USB memory, or a secure digital (SD) memory card, can be employed as the storage medium of the program. Executing a program by the CPU corresponds to executing a method corresponding to the program.

Appendix (2)

The present disclosure also includes the following configurations.

Configuration (1)

A position estimation system that estimates a relative position of a mobile terminal with respect to a vehicle by performing wireless communication with the mobile terminal carried by a user via multiple communication devices mounted on the vehicle,
  in which the multiple communication devices include at least one radar vicinity device (17a to 17d) which is a communication device disposed in a vicinity region of a millimeter wave radar (17), and
  the radar vicinity device is disposed on a back side of the millimeter wave radar that is closest to the radar vicinity device.

Configuration (1a)

The position estimation system according to the configuration (1),
  in which the millimeter wave radar is a millimeter wave radar disposed inside a rear bumper, and
  as the radar vicinity device, a communication device disposed on the back side of the millimeter wave radar inside the rear bumper is provided.

Configuration (1b)

The position estimation system according to the configuration (1) or (1a),
  in which the millimeter wave radar is a millimeter wave radar disposed inside a front bumper, and
  as the radar vicinity device, a communication device disposed on the back side of the millimeter wave radar inside the front bumper is provided.

Configuration (1c)

The position estimation system according to any one of the configurations (1), (1a), and (1b),
  in which a region within 0.2 m from the millimeter wave radar is the vicinity region of the millimeter wave radar.

Configuration (2)

A vehicle short-range communication device that is disposed in a vicinity region of a millimeter wave radar and directly wirelessly communicates with a mobile terminal carried by a user, compliant with a predetermined short-range wireless communication standard, the vehicle communication device including:
  an antenna (122) that receives a signal from the mobile terminal;
  a circuit board (121) on which an electronic component that process the signal received by the antenna is mounted; and
  a housing (126) that accommodates the antenna and the circuit board, in which a shield portion (127) that blocks a radio wave from the millimeter wave radar is provided in the housing.

Configuration (2a)

The vehicle communication device according to the configuration (2),
  in which the shield portion is provided in a side surface portion on a side in which the millimeter wave radar is planned to be disposed among side surface portions of the housing.

The invention claimed is:
1. A position estimation system that estimates a relative position of a mobile terminal with respect to a vehicle by wirelessly communicating, via a plurality of communication devices mounted in the vehicle, with the mobile terminal carried by a user, the plurality of communication devices including at least one radar vicinity device that is a communication device disposed near a millimeter wave radar, the position estimation system comprising:
  a processor and memory configured to:
  estimate a position of the mobile terminal based on a reception status of signals that are transmitted from the mobile terminal and received by the plurality of communication devices;
  determine, based on information from a sensor mounted in the vehicle, whether a current status is a simultane- ous operation scene in which both the millimeter wave radar and the radar vicinity device are operable simultaneously;
change an operating mode of at least one of the millimeter wave radar, the communication device, or the processor in response to determining that the current status is the simultaneous operation scene;
control operation of the plurality of communication devices including the radar vicinity device;
acquire radar operation information indicative of an operation state of the millimeter wave radar from the millimeter wave radar or a radar ECU that is configured to control operation of the millimeter wave radar;
determine whether the millimeter wave radar is in operation based on the acquired radar operation information; and
determine whether a current status is a predetermined position estimation scene in which the position of the mobile terminal is estimated based on a communication status between the communication device and the mobile terminal, wherein
the processor is configured to determine that the current status is the simultaneous operation scene when the processor determines that the current status is the position estimation scene and the millimeter wave radar is in operation, and
the processor is configured to change the operating mode of the communication device in response to determining that the current status is the simultaneous operation scene.

2. The position estimation system according to claim 1, wherein
the processor is configured to acquire information indicative of transmission timing of a probe wave of the millimeter wave radar, and
the processor is configured to control the operation of the communication device such that timing at which the communication device receives a signal from the mobile terminal is not aligned with the transmission timing of the probe wave by the millimeter wave radar in response to determining that the current status is the simultaneous operation scene.

3. The position estimation system according to claim 2, wherein
the processor is configured to control, in response to determining that the current status is the simultaneous operation scene, the communication device to communicate with the mobile terminal during a pause period during which the millimeter wave radar does not transmit the probe wave.

4. The position estimation system according to claim 2, wherein
the millimeter wave radar is configured to change a transmission direction of the probe wave among directions for the probe wave including a predetermined direction,
the probe wave has a minimum influence on the radar vicinity device when the probe wave is transmitted in the predetermined direction from the millimeter wave radar, and
the processor is configured to control the communication device to communicate with the mobile terminal during a period in which the millimeter wave radar transmits the probe wave in the predetermined direction.

5. The position estimation system according to claim 3, wherein the mobile terminal is configured to serve as a communication master device and the communication device is configured to serve as a communication slave device, and
the processor is configured to control the communication device to transmit, to the mobile terminal, a timing adjustment signal indicative of timing at which a signal is transmitted to the communication device from the mobile terminal in response to determining that the current status is the simultaneous operation scene.

6. The position estimation system according to claim 1, wherein
the radar vicinity device is configured to change directivity in a plurality of patterns including a predetermined pattern,
the radar vicinity device has a minimum interference with the millimeter wave radar when the directivity of the radar vicinity device is set in the predetermined pattern, and
the processor is further configured to control the radar vicinity device to set the directivity in the predetermined pattern when the millimeter wave radar is in operation.

7. The position estimation system according to claim 1, wherein
the processor is further configured to
control operation of the millimeter wave radar,
acquire communication device operation information indicative of an operation state of the communication device from the communication device or an ECU that is configured to control operation of the communication device,
determine whether the radar vicinity device is in operation based on the acquired information based on the acquired communication device operation information,
determine whether the current status is the simultaneous operation scene based on the operation state of the radar vicinity device, and
change the operating mode of the millimeter wave radar in response to determining that the current status is the simultaneous operation scene.

8. A position estimation method executed by a processor for estimating a relative position of a mobile terminal with respect to a vehicle by wirelessly communicating, via a plurality of communication devices mounted in the vehicle, with the mobile terminal carried by a user, the plurality of communication devices including at least one radar vicinity device which is a communication device disposed near a millimeter wave radar, the position estimation method comprising:
estimating a position of the mobile terminal based on a reception status of signals that are transmitted from the mobile terminal and received by the plurality of communication devices;
determining, based on information from a sensor mounted in the vehicle, whether a current status is a simultaneous operation scene in which both the millimeter wave radar and the radar vicinity device are operable simultaneously;
changing, in response to determining that the current status is the simultaneous operation scene, at least one of an operating mode of the millimeter wave radar, an operating mode of the communication device, or a content of a process of estimating the position of the mobile terminal;

controlling operation of the plurality of communication devices including the radar vicinity device;

acquiring radar operation information indicative of an operation state of the millimeter wave radar from the millimeter wave radar or a radar ECU that is configured to control operation of the millimeter wave radar;

determining whether the millimeter wave radar is in operation based on the acquired radar operation information; and determining whether a current status is a predetermined position estimation scene in which the position of the mobile terminal is estimated based on a communication status between the communication device and the mobile terminal, wherein the current status is determined to be the simultaneous operation scene when the current status is determined to be the position estimation scene and the millimeter wave radar is determined to be in operation, and the operating mode of the communication device is changed in response to determining that the current status is the simultaneous operation scene.

* * * * *